United States Patent [19]

Matsufuji

[11] 4,137,192
[45] Jan. 30, 1979

[54] LIQUID CRYSTALLINE COMPOSITION

[75] Inventor: Yoji Matsufuji, Tokyo, Japan

[73] Assignee: Canon Kabushiki Kaisha, Tokyo, Japan

[21] Appl. No.: 543,431

[22] Filed: Jan. 23, 1975

[30] Foreign Application Priority Data

| Jan. 25, 1974 | [JP] | Japan | 49-10732 |
| Jan. 31, 1974 | [JP] | Japan | 49-13020 |
| Jan. 31, 1974 | [JP] | Japan | 49-13021 |
| May 30, 1974 | [JP] | Japan | 49-61346 |

[51] Int. Cl.$^2$ ............................ G02F 1/13; C09K 3/34
[52] U.S. Cl. .................................. 252/299; 252/408; 350/350
[58] Field of Search .......................... 252/299, 408; 350/160 LC, 150, 350; 428/1

[56] References Cited

U.S. PATENT DOCUMENTS

| 3,815,972 | 6/1974 | Hsieh | 252/299 |
| 3,836,478 | 9/1974 | Green et al. | 252/299 |
| 3,891,307 | 6/1975 | Tsukamoto et al. | 350/160 LC |
| 3,952,046 | 4/1976 | Scherrer et al. | 252/299 |
| 3,953,491 | 4/1976 | Steinstrasser et al. | 252/299 |
| 3,954,653 | 5/1976 | Yamazaki | 252/299 |
| 4,011,173 | 3/1977 | Steinstrasser | 252/299 |
| 4,020,002 | 4/1977 | Oh | 252/299 |
| 4,043,935 | 8/1977 | Kanbe | 252/299 |
| 4,046,708 | 9/1977 | Dubois | 252/299 |
| 4,083,797 | 4/1978 | Oh | 252/299 |

FOREIGN PATENT DOCUMENTS

| 807165 | 11/1973 | Belgium | 252/299 |
| 2024269 | 12/1971 | Fed. Rep. of Germany | 252/299 |
| 2139628 | 2/1973 | Fed. Rep. of Germany | 252/299 |
| 2306738 | 8/1973 | Fed. Rep. of Germany | 252/299 |
| 2306739 | 8/1973 | Fed. Rep. of Germany | 252/299 |
| 2321632 | 11/1974 | Fed. Rep. of Germany | 252/299 |
| 2522722 | 2/1976 | Fed. Rep. of Germany | 252/299 |
| 2538865 | 3/1976 | Fed. Rep. of Germany | 252/299 |
| 2252132 | 6/1975 | France | 252/299 |
| 50-23385 | 3/1975 | Japan | 252/299 |

OTHER PUBLICATIONS

Gray, G. W., et al., Electronics Letters, vol. 9, No. 6, pp. 130–131 (Mar. 1973).
Oh, Chan S., Mol. Cryst. Liq. Cryst., vol. 42, pp. 1–14, (1977).

*Primary Examiner*—Benjamin R. Padgett
*Assistant Examiner*—T. S. Gron
*Attorney, Agent, or Firm*—Fitzpatrick, Cella, Harper & Scinto

[57] ABSTRACT

A liquid crystalline composition comprises at least one kind of biphenyl type liquid crystal materials having the positive dielectric anisotropy and at least one kind of other liquid crystal materials. The novel liquid crystalline composition of the present invention possesses extended ranges of the nematic mesomorphic temperature which are significantly larger than those of the individual liquid crystal material of the composition and are stable at a room temperature.

67 Claims, 15 Drawing Figures

(a)

(b)

LIQUID CRYSTALLINE COMPOSITION G-I

MIXED LIQUID CRYSTAL E-3

LIQUID CRYSTALLINE COMPOSITION

BACKGROUND OF THE INVENTION

1. Field of the Invention

This invention relates generally to a liquid crystalline composition, and, more particularly, it is concerned with such liquid crystalline compositions which have extended ranges of the nematic liquid mesomorphic temperature, are stable at room temperature, and have an applied use in the field of electro-optical display devices.

2. Description of the Prior Art

As is well known, there are three types of liquid crystals depending on their molecular orientation, i.e., nematic, smectic, and cholesteric. Of these, development in the nematic liquid crystal material for use in electro-optical display devices has been very active in recent years.

The nematic liquid crystal is classified into two groups according to the dielectric property thereof. The first group in an Nn type liquid crystal having a negative dielectric anisotropy, wherein such dielectric anisotropy lies in the direction substantially perpendicular to the molecular axis. The second group is an Np type liquid crystal having a positive dielectric anisotropy, wherein such dielectric anisotropy is substantially parallel with the molecular axis.

The Nn type liquid crystal has been the focus of research and development since it was applied to a panel type display device utilizing its dynamic scattering mode (DSM) which was discovered by Heilmeier of R.C.A. in 1968, and it is now practically commercialized in horological instruments, desk-type electronic calculators, and so forth.

On the other hand, the Np type liquid crystal, on account of its substantial inability to exhibit the dynamic scattering mode, has been considerably behind in its development. However, it has begun to draw the attention of many experts in this field since M. Schadt and W. Helfrich of F. Hoffmann-La Roche & Co. published in "Applied Physics Letter," Vol. 18(4), p 127, 1971 a paper concerning the twisted nematic mode (TNM).

While the method of manufacturing a liquid crystal cell for display devices utilizing the Np type liquid crystal exhibiting such twisted nematic mode is reported in detail in the abovementioned literature as well as described in published Japanese patent application No. 47-11737, it can be outlined as follows.

The liquid crystal cell is of such construction that the Np type liquid crystal material is interposed between a pair of electrodes through a spacer, at least one of which is transparent, wherein the electrode surfaces are so orientation-treated as to cause the molecular axes of the liquid crystal material to be within the electrode surfaces, and to cause the molecular axes of the liquid crystal arranged on each electrode surface to be perpendicular to each other, and the molecular axes are in parallel with the electrode surfaces and form a spiral at an angle of 90° from one of the surfaces to another. It is, of course, possible that this spiral angle can be freely varied from 0 to 90 degrees by changing the direction of the orientation. This liquid crystal cell is further provided with a polarization plate to enable the same to be used for display purposes.

The principle of display utilizing this twisted nematic mode of the Np type liquid crystal can be explained in the following way. In the case of the 90 degree spiral, when the an electric field is not being applied to the cell, linear polarized light which has been vertically projected onto the electrode surface comes out of the liquid crystal cell as the result of the plane of the polarization being turned 90 degrees. Therefore, when this liquid crystal cell is placed between a cross-nicol prism to observe the transmitted light through it, the sight looks bright, and, when the cell is placed between a parallel-nicol prism for observation, the sight is seen dark. In this state of the liquid crystal cell, when an appropriate electric voltage (saturated voltage) is impressed on this cell, the molecular orientation is carried out in such a way that the long (or major) axis of the liquid crystal molecule becomes perpendicular to the electrode surface, so that, opposite to the case where no voltage is impressed, the sight is seen dark in the case of the observation through the cross-nicol prism, and the sight is seen bright in the case of the observation through the parallel-nicol prism. Accordingly, a required pattern display can be achieved by the contrast between the bright portion of the sight and the dark portion of the same.

This twisted nematic mode (TNM) has a quick response, operates at a low voltage, is small in its electric power consumption, and has some other advantages as compared with, for example the conventional dynamic scattering mode (DSM), on account of which this mode is indispensable in the application of the liquid crystal to the display devices. As a consequence, development in this Np type liquid crystal to be used for the foregoing purposes has become more and more active in recent years.

However, Np type liquid crystals of benzylidene, azo, azoxy, and carboxylic acid ester series which have been heretofore known have several disadvantages, owing to which they have not yet been proved satisfactory in practical use. The reason for this can be summarized as follows.

(1) At first, there exists a temperature range between a transition temperature $T_N$ where the material shifts from a crystal or smectic liquid crystal phase to the nematic liquid crystal phase and a transition temperature $T_I$ where the material shifts from the nematic liquid phase to an istropic liquid, i.e., a temperature range where the material exhibits the nematic liquid crystal phase (hereinafter referred to as "mesomorphic range" or simply "M.R.") at a higher temperature side. Accordingly, the material possesses high transition temperature $T_N$, and does not exhibit the nematic liquid crystal phase at a room temperature or a lower temperature. For instance, liquid crystal materials of the carboxylic acid ester type have their M.R. almost deviated to the high temperature side of as high as 60° to 200° C., hence they lack practability. Also, in the liquid crystal materials of the azoxy type, there have so far been none that are capable of exhibiting the nematic liquid crystal phase at a normal temperature in its single form (most of these materials have the lower limit of M.R., that is, $T_N$ of as high as 100° C. or so). Even in the mixed liquid crystals of the azoxy type, there are only a few having M.R. of from 0° to 60° C. or so. On account of this, when this type of liquid crystal is to be used, it has been the usual practice to admix it with an Nn type low temperature liquid crystal such as, for example, p-methoxybenzylidene-p'-n-butylaniline (having M.R. of 20° to 40° C.) so as to broaden their M.R. to a low temperature region. However, the Np type liquid crystalline composition, in which the Nn type liquid crystal is incorporated, has been found to be slower in its response than that of the liquid crystalline composition consisting of the Np type liquid crystal alone, or a mixture of Np type liquid crystal materials, and to have other disadvantages in its electrical characteristics.

Further, in the general liquid crystal material, there is the so-called overcooling phenomenon, wherein the liquid crystal phase can be maintained even when the temperature is decreased lower than the lower limit temperature $T_N$ of M.R. If this degree of overcooling is not sufficiently high, the device utilizing such liquid crystal therein becomes inoperative when, for example, it is cooled below the lower limit temperature of the M.R. of the liquid crystal through carelessness or by an unexpected event to solidify the liquid crystal. On the contrary, however, when the degree of the overcooling is sufficiently high, the liquid crystal remains unsolidified, even if the liquid crystal is cooled below the lower limit temperature $T_N$ of the M.R., so that its electro-optical property within the M.R. can be retained as is. In view of such facts, development of a liquid crystal material having a high degree of overcooling has been desired.

(2) Secondly, a field-effect type cell utilizing the abovementioned Np type liquid crystal is capable of being driven by a relatively lower voltage than the liquid crystal cell utilizing the dynamic scattering mode (usually at 3 to 6 volts), and is rather difficult to cause electric current to flow therethrough, hence its service life can be relatively prolonged. However, on account of its being affected by the electrochemical reactions and ultraviolet rays, the cell has been rather short in life in comparison with the conventional Nixie tube, L.E.D., and so forth.

(3) Thirdly, the liquid crystal cell of this type becomes excellent in its electrical performance according as the dielectric anisotropy is larger. However, in the conventional liquid crystal material, its dielectric anisotropy was from 0 to +3 or so, the value of which was not sufficient for the practical use of the liquid crystal cell.

(4) Fourthly, the liquid crystal material is generally of high viscosity, which largely affects the voltage impression, and response at the time of elimination, particularly the trailing at the time of the elimination and it is poor in the response upon pulse drive and is not suitable for multiple place dynamic drive. Therefore, the liquid crystal material having a low viscosity has been desired.

The afore-described biphenyl type liquid crystal material of Np type has been found to solve various problems inherent in the conventional liquid crystal material, and was published in "Electronics Letter," Vol. 9(5), Mar. 8, 1973.

This liquid crystal material represented by the following general formula,

in comparison with the conventional liquid crystal material, is very stable chemically, since the material has no functional group between the two phenyl groups. Also, this liquid crystal material has a large dielectric anisotropy of as high as +10, is lower in its torsional viscosity than that of the conventional liquid crystal, exhibits the liquid crystal phase at a relatively low temperature, and possesses a high degree of overcooling. However, even in such a favorable liquid crystal, its mesomorphic range (M.R.) is as narrow as from −2° C. to +37° C., and, moreover, the range is deviated to a lower temperature side (normally, the M.R. of from −10° C. to +60° C. is necessary), so that the material is still not satisfactory from a practical point of view. Such narrow mesomorphic range naturally restricts the useful temperature range with the consequence that the marketing area for such a product is limited, hence their value as a commercial article inevitably lowers. In another aspect, in the alpha-numerical display, there are two systems of static drive and dynamic drive for the reason of the lead wire connection, and, where the number of characters to be displayed is large, the dynamic drive system has been known to be very advantageous. In this case, however, due to the narrow range of mesomorphic temperature of this liquid crystal material, the power source voltage has to be varied in compliance with variations in the ambient temperature, hence it has so far not been possible to fully adopt the dynamic drive system.

In order to conduct dynamic drive (time sharing), a voltage is not applied continuously to a segment to be displayed, but it is periodically applied to the segment at a short pulse width. The liquid crystal material to be utilized for a liquid crystal display element is required to exhibit appropriately a response to the short pulse width. Specifically, the ratio of the time for applying a voltage onto one segment to the pulse repetition time or one cycle time within the duration of signal input is called the duty ratio. A smaller duty ratio stands for a shorter voltage applying duration within one pulse repetition time or one cycle time. Consequently, the dynamic drive can be made possible only by utilizing the liquid crystal material which is capable of exhibiting a good response under the condition of a small duty ratio.

Where the ratio of a voltage applying duration (ON) to a no-voltage applying duration (OFF) is 1:1, the duty ratio is ½. In this case, the voltage is applied to the segment for the half of the signal input duration (one cycle time), and at this time, when the signal input is effected cyclicly, it becomes possible theoretically to conduct 2-place dynamic drive. In the use of the conventional liquid crystal having a negative dielectric anisotropy, it is hardly possible to make the duty ratio smaller, and therefore, the dynamic drive system has been inoperable so far. Even by the use of the conventional liquid crystal having a positive dielectric anisotropy, only 2-place dynamic drive has been operable.

To put the above in more detail, the dynamic drive is theoretically the same as the matrix drive as shown in FIG. 1. Generally speaking, in liquid crystal cells, the way of impressing voltage is carried out as shown in FIG. 1 so as to prevent undesirable cross-talk. In this drawing, the vertical and horizontal wires to denote the electrodes are shown to intersect each other, although in the actual construction of the liquid crystal display cell, they are spaced apart at each of the crossing points, in which space the liquid crystal material is filled.

In FIG. 1, the black dots denote the selection points, to which a voltage V is applied, while the white dots represent the semi-selection or non-selection points, to which a voltage 1/3V is applied. The voltage V is so determined that these black dot portions may be subjected to scattering, and the white dot portions may not be subjected to scattering.

FIG. 2 indicates the relationship between electric voltage and percent light transmission (hereinafter called "transmission"). In this case, if a voltage V which is sufficiently larger than the voltage value Vs at the time of the transmission reaching its point of saturation can be used, there occurs no serious problem in the contrast, etc. However, as mentioned in the foregoing, there inevitably takes place cross-talk, which compels the restrictive upper limit voltage Vb to be set. On the other hand, as it is necessary to obtain a certain definite transmission, a lower limit voltage Va is also required for such purpose. In other words, when the matrix drive is to be carried out by utilizing the liquid crystal cell, the power source voltage V should be so designed as to satisfy the relationship Va≦V≦Vb. In this case, however, as this "Vb minus Va" relationship (which will be referred to hereinafter as "voltage margin" or "marginal voltage") is as small as from 0.1 to 0.2V or so, the circuit designing becomes very complex and expensive. In addition, as there is another disadvantage of the voltage margin being considerably varied by the temperature, the useful temperature range is naturally restricted even in this aspect, from which point the value of this liquid crystal cell is still poor as a commercial article.

More amplified explanations of the foregoing will be given in the following with reference to FIGS. 3(a) and 3(b). FIG. 3(a) shows the relationship between temperature and voltage margin within the mesomorphic range (M.R.), and FIG. 3(b) indicates the same relationship in the typical example of an ordinary nematic liquid crystal.

In FIG. 3(a), when the temperature range for driving the liquid crystal cell is set between $T_1$ and $T_2$, the liquid crystalline composition becomes excellent as the portion S shaded with oblique lines in the drawing becomes larger. However, if, as shown in FIG. 3(b), the lower limit voltage Va at $T_1$ is greater than the upper limit voltage Vb at $T_2$, there exists no part at all corresponding to the above-mentioned portion S, so that, when the driving temperature range $T_1$-$T_2$ is given preference, it become necessary that the circuit should be so designed as to cause the voltage to vary depending on the temperature variations. Also, if the voltage is made constant, the operable temperature range of the device which utilizes the liquid crystal cell should be restricted. As a consequence, not only will the marketing area of the product cell be naturally limited, but also there are various disadvantages in the production cost or sales of such a product. For the above-mentioned reasons, development of the liquid crystalline compound having sufficiently large mesomorphic range (M.R.) with respect to the driving temperature range $T_1$-$T_2$ has been demanded.

SUMMARY OF THE INVENTION

In view of the afore-described various points of problems inherent in the conventional liquid crystal materials, it is a primary object of the present invention to provide a liquid crystalline composition which possesses various advantages such as a large degree of overcooling, exhibiting the liquid crystal phase at a low temperature, having a broadened range of liquid crystal temperature (M.R.), having a chemically stable structure, having a large positive dielectric anisotropy, and excellent electro-optical properties.

It is another object of the present invention to provide a liquid crystalline composition which exhibits in addition to the above mentioned properties a low viscosity and a good response in case of the pulse drive and which can be applied to a dynamic drive.

It is a further object of the present invention to provide a liquid crystalline composition which can be used in a liquid crystal display device.

It is still another object of the present invention to provide a liquid crystalline composition which can be applied to 4 or more place dynamic drive.

It is a still further object of the present invention to provide a liquid crystalline composition which can be used in an alpha-numerical display device.

It is a still further object of the present invention to provide a liquid crystalline composition which can be used in an image display device.

It is a still further object of the present invention to provide a liquid crystalline composition which can be used in a light valve.

It is a still further object of the present invention to provide a liquid crystalline composition which can be used in a color display device.

According to the present invention, there is provided a liquid crystalline composition which comprises at least one kind of biphenyl type liquid crystal material represented by the following general formula (1) and having positive dielectric anisotropy; and at least one kind of other liquid crystal materials represented by the following general formulae (2) to (7),

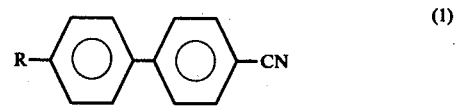

where R is selected from alkyl and alkoxy groups;

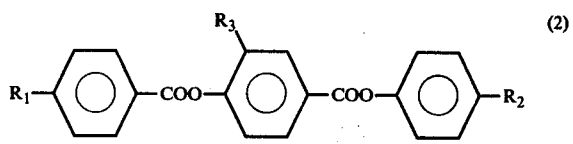

where $R_1$ and $R_2$ are selected from alkyl, alkoxy, acyloxy, and alkoxycarbonyloxy groups; and $R_3$ is hydrogen or a methyl group;

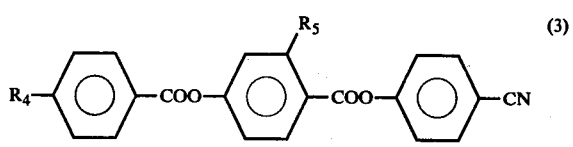

where $R_4$ is selected from alkyl and alkoxy groups; and $R_5$ is hydrogen or a methyl group;

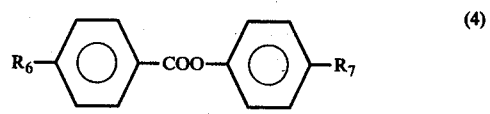

where any one of $R_6$ and $R_7$ is a cyano group, and the other is selected from alkyl, alkoxy, acyloxy, and alkoxycarbonyloxy groups;

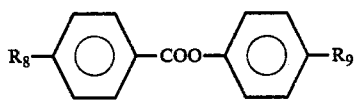

where $R_8$ and $R_9$ are selected from alkyl, alkoxy, acyloxy, and alkoxycarbonyloxy groups;

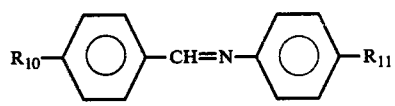

where any one of $R_{10}$ and $R_{11}$ is a cyano group, and the other is selected from alkyl, alkoxy, and acyloxy groups;

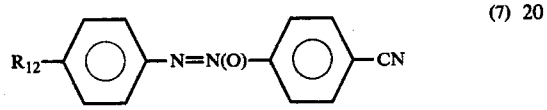

where $R_{12}$ is selected from alkyl, alkoxy, acyloxy, and alkoxycarbonyl groups.

The foregoing objects and other objects as well as the detailed construction of the liquid crystalline composition according to the present invention will become more apparent from the following description of the invention, when read in connection with several preferred examples thereof and the accompanying drawing.

DETAILED DESCRIPTION OF THE INVENTION

Figure 1:
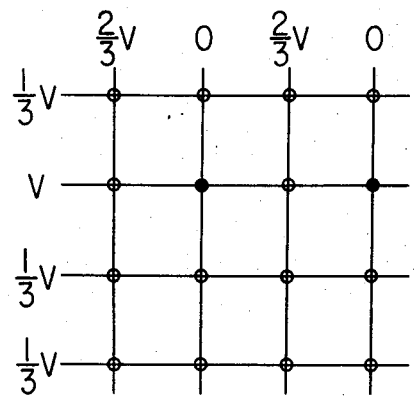
FIG. 1 is an explanatory diagram illustrating how one carries out the matrix drive using a liquid crystal display cell.
Figure 2:
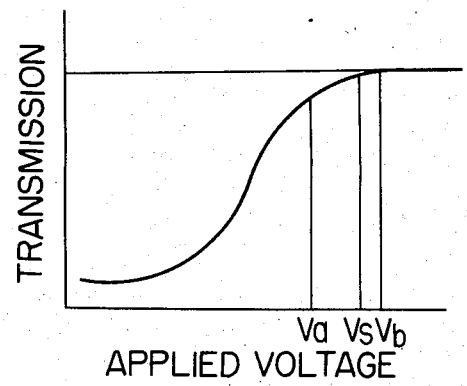
FIG. 2 is a graphical representation indicating the relationship between applied voltage and transmission, when voltage is impressed on the liquid crystal display cell.
Figure 3:
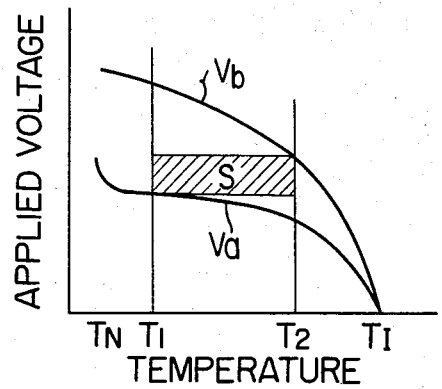
FIG. 3(a) is a graphical representation indicating the relationship between temperature and voltage margin within the mesomorphic range (M.R.)
FIG. 3(b) is also a graphical representation indicating the temperature dependency of a typical example of an ordinary nematic liquid crystal.
Figure 3:
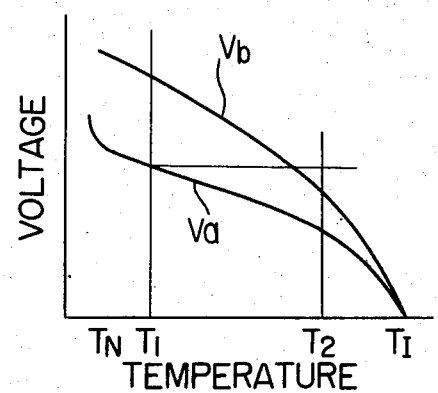

The characteristic feature of the present invention, as has already been stated in the foregoing, resides in the liquid crystalline composition which comprises at least one kind of biphenyl type liquid crystal material represented by the following general formula (1) and having a positive dielectric anisotropy; and at least one kind of other liquid crystal materials represented by the following general formulae (2) to (7),

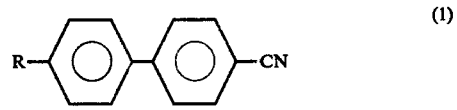

where R is selected from alkyl and alkoxy groups;

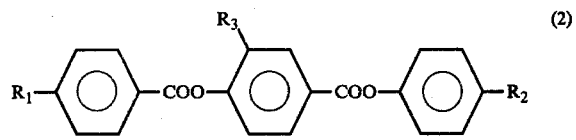

where $R_1$ and $R_2$ are selected from alkyl, alkoxy, acyloxy, and alkoxycarbonyloxy groups; and $R_3$ is hydrogen or a methyl group;

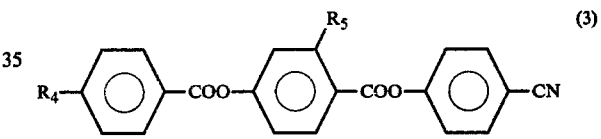

where $R_4$ is selected from alkyl, and alkoxy groups; and $R_5$ is hydrogen or a methyl group;

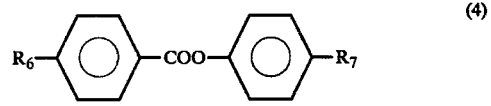

where any one of $R_6$ and $R_7$ is a cyano group, and the other is selected from alkyl, alkoxy, acyloxy, and alkoxycarbonyloxy groups;

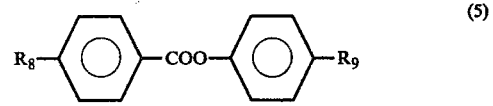

where $R_8$ and $R_9$ are selected from alkyl, alkoxy, acyloxy, and alkoxycarbonyloxy groups;

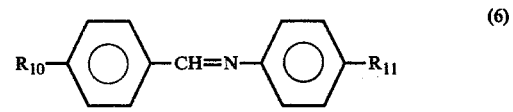

where any one of $R_{10}$ and $R_{11}$ is a cyano group, and the other is selected from alkyl, alkoxy, and acyloxy groups;

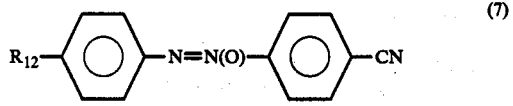

(7)

where $R_{12}$ is selected from alkyl, alkoxy, acyloxy, and alkoxycarbonyl groups.

The liquid crystalline composition according to the present invention possesses very wide range of mesomorphic temperature from a lower temperature side to a higher temperature side, and, owing to its stable chemical structure, is superior in various physical and chemical properties such as, for example, heat resistance, acid resistance, alkali resistance, light resistance, and weatherability, and so on. It is further stable against the electro-chemical reactions, and assumes colorless transparency when it is formed into a thin layer. Accordingly, the liquid crystal display device utilizing the liquid crystalline composition of the present invention almost does not change its electrical performance in the operating temperature range (e.g., 0° to 40° C.), whereby all the practical requirements for the performance such as contrast, response, and so on are fully met by the liquid crystalline composition of the present invention.

The liquid crystalline composition according to the present invention can be obtained by mixing the biphenyl type liquid crystal material represented by the general formula (1) and having the positive dielectric anisotropy, and at least one kind of the other liquid crystal materials represented by the general formulae (2) to (7). For the improvement in the electro-optical characteristics, it is desirable that the liquid crystal material of general formula (1) be larger in its quantity, for the improvement in the mesomorphic range (M.R.), i.e., in the temperature characteristic, it is desirable that the liquid crystal materials of the general formulae (2) to (7) be larger in their mixing quantity.

The liquid crystalline composition according to the present invention should preferably contain the biphenyl type liquid crystal material of the general formula (1) and at least one of the other liquid crystal materials of the general formulae (2) to (4), (6), and (7) in the following mixing ratio.

|  | normal | preferable | optimum |
|---|---|---|---|
| biphenyl type liquid crystal compound of general formula (1) | 10 – 99% by weight | 20 – 95% by weight | 50 – 90% by weight |
| other liquid crystal compound of general formulae (2), (3), (4), (6), & (7) | 90 – 1% by weight | 80 – 5% by weight | — |

In particular, when the liquid crystalline composition contains therein at least one of the liquid crystal materials of the general formulae (2)–(7) at a mixing ratio of 10 to 50% by weight, the best result can be obtained.

The biphenyl type liquid crystal material represented by the general formula (1) for use in the present invention may well be those having the positive dielectric anisotropy. Usually those liquid crystal materials wherein R is an alkyl group having a carbon content of from 4 to 15 are mostly used. Particularly preferable are those liquid crystal materials of the biphenyl type wherein R is an alkyl or alkoxy group having a carbon content of from 4 to 10. The most preferable are those liquid crystal materials wherein R is an alkyl or alkoxy group having a carbon content of from 5 to 8. Furthermore, the liquid crystal material represented by the general formula (1) may be those, in which R is a straight chain alkyl group or the straight chain alkoxy group. In this case, the nematic liquid crystal material is particularly preferable.

The radicals $R_1$ and $R_2$ in the liquid crystal material represented by the general formula (2) are usually selected from an alkyl group having a carbon content of from 1 to 9, an alkoxy group having a carbon content of from 1 to 10, an acyloxy group having a carbon content of from 1 to 7, and an alkoxycarbonyloxy group having a carbon content of from 4 to 6. Also, the radical $R_3$ is selected from a methyl group and hydrogen. The abovementioned alkyl, alkoxy, acyloxy, and alkoxycarbonyloxy groups should preferably be in the form of a straight chain. More preferably, when any one of $R_1$ and $R_2$ is an acyloxy or alkoxycarbonyloxy group, the other may be an alkyl or alkoxy group. Optimumly, the liquid crystal materials represented by the general formula (2) are those having positive dielectric anisotropy, and which exhibit the nematic liquid crystal phase at a certain temperature region.

For the liquid crystal material represented by the general formula (3), there are used those having positive dielectric anisotropy, and wherein $R_4$ is usually an alkyl group containing from 3 to 8 carbon atoms or an alkoxy group containing from 4 to 6 carbon atoms, and $R_5$ is either hydrogen or a methyl group. Particularly, those liquid crystal materials exhibiting the nematic liquid crystal phase are used most preferably. Optimumly, the radical $R_4$ should be in the form of a straight chain.

The liquid crystal materials represented by the general formula (4) are those having positive dielectric anisotropy, and wherein any one of $R_6$ and $R_7$ is a cyano group and the other is selected from alkyl, alkoxy, acyloxy, and alkoxycarbonyloxy groups. In particular, those liquid crystal materials exhibiting the nematic liquid crystal phase at a certain temperature region are preferably used. When $R_6$ is the cyano group, $R_7$ should preferably be selected from an alkyl group having a carbon content of from 3 to 10, an alkoxy group having a carbon content of from 1 to 9, or, more preferably, an alkyl group having a carbon content of from 6 to 8 or an alkoxy group having a carbon content of from 6 to 8. When $R_7$ is the cyano group, $R_6$ should preferably be selected from an alkyl group having a carbon content of from 3 to 10, an alkoxy group having a carbon content of from 1 to 9, an acyloxy group having a carbon content of from 5 to 8, and an alkoxycarbonyloxy group having a carbon content of from 5 to 8, or more preferably, an alkyl group having a carbon content of from 7 to 9, or an alkoxy group having a carbon content of from 5 to 7. Optimumly, any one of $R_6$ and $R_7$ is a cyano group, and the other is selected from a straight chain alkyl radical, a straight chain alkoxy group, a straight chain acyloxy group, and a straight chain alkoxycarbonyloxy group.

The liquid crystal material represented by the general formula (5) are those having negative dielectric anisotropy, and wherein the radicals $R_8$ and $R_9$ are selected from an alkyl group having a carbon content of from 2 to 10, an alkoxy group having a carbon content of from 1 to 8, an acyloxy group having a carbon content of from 1 to 7, and an alkoxycarbonyloxy group having a carbon content of from 3 to 8. More preferably, the radicals $R_8$ and $R_9$ are selected from a straight chain alkyl group, a straight chain alkoxy group, a straight chain acyloxy group, and a straight chain alkoxycarbonyloxy group. The liquid crystal material exhibiting the nematic liquid crystal phase in a certain temperature region is preferred.

When any one of $R_8$ and $R_9$ is an acyloxy group or alkoxycarbonyloxy group, and the other is an alkyl group or alkoxy group, the sum of the carbon atoms in $R_8$ and $R_9$ should preferably be 4 and above.

The liquid crystal materials represented by the general formula (5) are effective in improving the mesomorphic range (M.R.), i.e., the temperature characteristic of the liquid crystal, and should preferably be present in the liquid crystalline composition according to the present invention at a ratio of 10 to 50% by weight.

The liquid crystal materials represented by the general formula (6) are those having positive dielectric anisotropy, and wherein any one of $R_{10}$ and $R_{11}$ is a cyano group, and the other is selected from alkyl, alkoxy, and acyloxy groups. When $R_{11}$ is a cyano group, $R_{10}$ is selected from an alkyl group having a carbon content of from 3 to 8, an alkoxy group having a carbon content of from 1 to 10, and an acyloxy group having a carbon content of from 2 to 9. More preferably, $R_{10}$ is selected from an alkyl group having a carbon content of from 4 to 7, an alkoxy group having a carbon content of from 1 to 8, and an acyloxy group having a carbon content of from 4 to 7. Particularly, the liquid crystal material exhibiting the nematic liquid crystal phase is preferably used.

On the other hand, when $R_{10}$ is a cyano group, $R_{11}$ is selected from an alkyl group having a carbon content of from 3 to 10, an alkoxy group having a carbon content of from 1 to 8, and an acyloxy group having a carbon content of from 2 to 8. The alkyl group having a carbon content of from 3 to 8 is more preferable. Further, the alkyl, alkoxy, and acyloxy groups in the radicals $R_{10}$ and $R_{11}$ should optimumly be in straight chain form.

The liquid crystal materials represented by the general formula (7) are those having positive dielectric anisotropy, and wherein $R_{12}$ is selected from an alkyl group, alkoxy group, acyloxy group, and alkoxycarbonyl group. Usually, $R_{12}$ is selected from an alkyl group having a carbon content of from 3 to 10, an alkoxy group having a carbon content of from 1 to 10, an acyloxy group having a carbon content of from 3 to 10, and an alkoxycarbonyl group having a carbon content of from 1 to 10. More preferably, $R_{12}$ is selected from an alkyl group having a carbon content of from 4 to 8, an alkoxy group having a carbon content of from 1 to 8, an acyloxy group having a carbon content of from 5 to 7, and an alkoxycarbonyl group having a carbon content of from 5 to 8. Furthermore, the liquid crystal materials of the general formula (7) should preferably be nematic liquid crystal materials, wherein the radical $R_{12}$ is particularly a straight chain alkyl group, a straight chain alkoxy group, a straight chain acyloxy group, or a straight chain alkoxycarbonyl group.

Moreover, for the reason of its production in general, the liquid crystal material of the general formula (7) is a mixture of

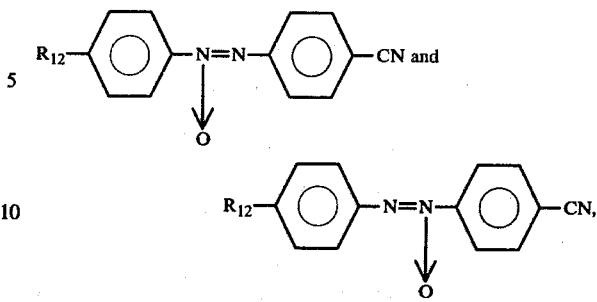

which is easily understandable to persons skilled in the art to represent such compound in terms of the general formula (7).

When the liquid crystalline composition according to the present invention is prepared from the liquid crystal material of the general formula (1) and the liquid crystal material of the general formula (2) as the principal constituents, the following mixing ratio between them is contemplated.

| Liquid Crystal Material | Normal (wt. %) | Preferable (wt. %) | Optimum (wt. %) |
| --- | --- | --- | --- |
| (1) | 10 – 99 | 20 – 95 | 50 – 90 |
| (2) | 90 – 1 | 80 – 5 | 50 – 10 |

When the liquid crystalline composition of the present invention is prepared from the liquid crystal material of the general formula (1) and the liquid crystal material of the general formula (3) as the principal constituents, the following mixing ratio between them is contemplated.

| Liquid Crystal Material | Normal (wt. %) | Preferable (wt. %) | Optimum (wt. %) |
| --- | --- | --- | --- |
| (1) | 10 – 95 | 20 – 90 | 50 – 90 |
| (3) | 90 – 5 | 80 – 10 | 50 – 10 |

When the liquid crystalline composition of the present invention is prepared from the liquid crystal material of the general formula (1) and the liquid crystal material of the general formula (4) as the principal constituents, the following mixing ratio between them is contemplated.

| Liquid Crystal Material | Normal (wt.%) | Preferable (wt.%) |
| --- | --- | --- |
| (1) | 10 – 95 | 30 – 90 |
| (4) | 90 – 5 | 70 – 10 |

Further, when the liquid crystalline composition of the present invention is prepared from the liquid crystal material of the general formula (1) and the liquid crystal material of the general formula (6) as the principal constituents, the following mixing ratio between them is contemplated.

| Liquid Crystal Material | Normal (wt.%) | Preferable (wt.%) | Optimum (wt.%) |
| --- | --- | --- | --- |
| (1) | 10 – 95 | 20 – 90 | 50 – 90 |

-continued

| Liquid Crystal Material | Normal (wt.%) | Preferable (wt.%) | Optimum (wt.%) |
|---|---|---|---|
| (6) | 90 – 5 | 80 – 10 | 50 – 10 |

Furthermore, when the liquid crystalline composition of the present invention is prepared from the liquid crystal material of the general formula (1) and the liquid crystal material of the general formula (7) as the principal constituents, the following mixing ratio between them is contemplated.

| Liquid Crystal Material | Normal (wt.%) | Preferable (wt.%) |
|---|---|---|
| (1) | 10 – 95 | 25 – 90 |
| (7) | 90 – 5 | 75 – 10 |

As has already been stated in the foregoing, the liquid crystalline composition of the present invention is basically composed of the biphenyl type liquid crystal material represented by the general formula (1) and at least one kind of the liquid crystal materials represented by the general formulae (2) to (7). Therefore, the mixed liquid crystal of the general formulae (2) and (3), the mixed liquid crystal of the general formulae (2) and (5), the mixed liquid crystal of the general formulae (2), (3), and (5), and any other proper combinations of the liquid crystal materials of the general formulae (2) to (7) may be made with the liquid crystal material of the general formula (1). All these combinations may well be within the scope of the present invention. In particular, the liquid crystalline composition composed of 10 to 99% by weight of the liquid crystal material of the general formula (1) and 1 to 90% by weight of the mixed liquid crystal material composed of 50 to 90% by weight of the liquid crystal material of the general formula (2) and 10 to 50% by weight of the liquid crystal material of the general formula (5) provides a sufficiently wide mesomorphic range (M.R.), and possesses large positive dielectric anisotropy.

Also, for the purpose of improving the mesomorphic range (M.R.) or the electro-optical characteristic, the other materials such as those listed below may be added to the liquid crystalline composition according to the present invention at a normal mixing ratio of 30% by weight or below, or preferably 25% or below, or optimumly 20% by weight or below. In particular, the materials $Z_1$ through $Z_8$ are most effective in improving the temperature as well as the electro-optical characteristics of the liquid crystalline composition of the present invention.

| Material | Formula |
|---|---|
| $Z_1$ | 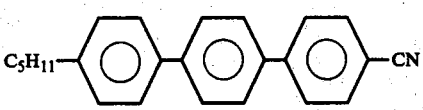 |
| $Z_2$ |  |
| $Z_3$ | 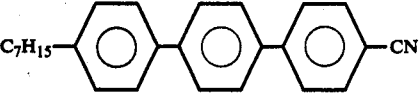 |
| $Z_4$ | 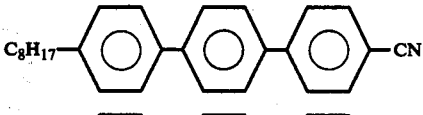 |
| $Z_5$ | 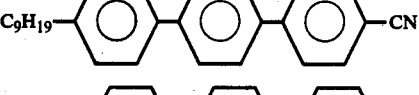 |
| $Z_6$ | 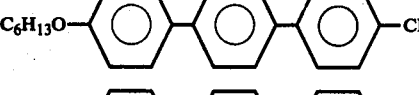 |
| $Z_7$ | 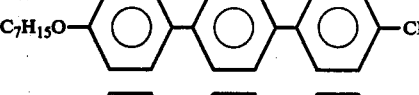 |
| $Z_8$ | 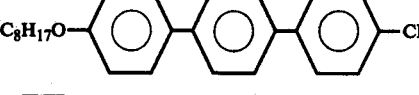 |
| $Z_9$ | 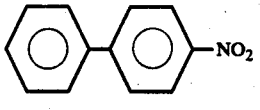 |
| $Z_{10}$ | 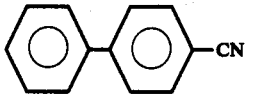 |
| $Z_{11}$ | 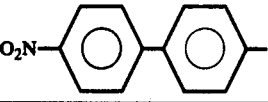 |

Actual examples of the liquid crystal materials represented by the general formula (1) which are preferably used for the purpose of the present invention are as follows.

Table 1

R—⌬—⌬—CN Type materials

| Material | R | Material | R |
|---|---|---|---|
| $A_1$ | $C_4H_9$ | $B_1$ | $C_4H_9O$ |
| $A_2$ | $C_5H_{11}$ | $B_2$ | $C_5H_{11}O$ |
| $A_3$ | $C_6H_{13}$ | $B_3$ | $C_6H_{13}O$ |
| $A_4$ | $C_7H_{15}$ | $B_4$ | $C_7H_{15}O$ |
| $A_5$ | $C_8H_{17}$ | $B_5$ | $C_8H_{17}O$ |
| $A_6$ | $C_9H_{19}$ | $B_6$ | $C_9H_{19}O$ |
| $A_7$ | $C_{10}H_{21}$ | $B_7$ | $C_{10}H_{21}O$ |
| $A_8$ | $C_{11}H_{23}$ | $B_8$ | $C_{11}H_{23}O$ |
| $A_9$ | $C_{12}H_{25}$ | $B_9$ | $C_{12}H_{25}O$ |
| $A_{10}$ | $C_{13}H_{27}$ | $B_{10}$ | $C_{13}H_{27}O$ |
| $A_{11}$ | $C_{14}H_{29}$ | | |
| $A_{12}$ | $C_{15}H_{31}$ | | |

Similarly, preferred examples of the liquid crystal materials represented by the general formula (2) are as follows.

Table 2

$R_1$—⟨◯⟩—COO—⟨◯(R_3)⟩—COO—⟨◯⟩—$R_2$  Type Materials

| Material | $R_1$ | $R_2$ | $R_3$ | Material | $R_1$ | $R_2$ | $R_3$ |
|---|---|---|---|---|---|---|---|
| $C_1$ | $C_2H_5$ | $C_2H_5$ | H | $E_9$ | $C_6H_{13}O$ | $C_4H_9$ | H |
| $C_2$ | $C_3H_7$ | $C_5H_{11}$ | H | $E_{10}$ | $CH_3O$ | $C_5H_{11}$ | H |
| $C_3$ | $C_3H_7$ | $C_8H_{17}$ | H | | | | |
| $C_4$ | $C_4H_9$ | $C_4H_9$ | H | $F_1$ | $CH_3O$ | $C_3H_7O$ | H |
| $C_5$ | $C_6H_{13}$ | $C_8H_{13}$ | H | $F_2$ | $CH_3O$ | $C_6H_{13}O$ | H |
| $C_6$ | $C_7H_{15}$ | $C_2H_5$ | H | $F_3$ | $C_2H_5O$ | $C_4H_9O$ | H |
| $C_7$ | $C_9H_{19}$ | $C_5H_{11}$ | H | $F_4$ | $C_4H_9O$ | $C_4H_9O$ | H |
| $C_8$ | $CH_3$ | $C_4H_9$ | H | $F_5$ | $C_6H_{13}O$ | $CH_3O$ | H |
| $C_9$ | $C_5H_{11}$ | $C_7H_{15}$ | H | $F_6$ | $C_5H_{13}O$ | $C_5H_{11}O$ | H |
| $C_{10}$ | $C_8H_{17}$ | $C_2H_5$ | H | $F_7$ | $C_8H_{17}O$ | $C_4H_9O$ | H |
| $C_{11}$ | $C_2H_5$ | $C_4H_9$ | H | | | | |
| | | | | $G_1$ | $CH_3COO$ | $C_4H_9$ | H |
| $D_1$ | $C_2H_5$ | $CH_3O$ | H | $G_2$ | $CH_3COO$ | $C_4H_9O$ | H |
| $D_2$ | $C_4H_9$ | $CH_3O$ | H | $G_3$ | $C_4H_9COO$ | $CH_3$ | H |
| $D_3$ | $C_3H_7$ | $C_2H_5O$ | H | $G_4$ | $C_4H_9COO$ | $C_4H_9$ | H |
| $D_4$ | $C_5H_{11}$ | $C_8H_{17}O$ | H | $G_5$ | $C_6H_{13}COO$ | $C_2H_5$ | H |
| $D_5$ | $C_5H_{11}$ | $C_3H_7O$ | H | $G_6$ | $C_7H_{15}COO$ | $C_8H_{17}$ | H |
| $D_6$ | $C_6H_{13}$ | $C_6H_{13}O$ | H | $G_7$ | $C_4H_9COO$ | $C_4H_9O$ | H |
| $D_7$ | $C_7H_{15}$ | $C_4H_9O$ | H | $G_8$ | $C_2H_5COO$ | $C_6H_{13}O$ | H |
| $D_8$ | $C_7H_{13}$ | $C_2H_5O$ | H | | | | |
| $D_9$ | $C_8H_9$ | $C_4H_9O$ | H | $Y_1$ | $CH_3$ | $C_5H_{11}$ | $CH_3$ |
| $D_{10}$ | $C_8H_{17}$ | $C_{10}H_{21}O$ | H | $Y_2$ | $C_3H_7$ | $C_5H_{11}$ | $CH_3$ |
| $D_{11}$ | $CH_3$ | $C_7H_{15}O$ | H | $Y_3$ | $C_4H_9$ | $C_9H_{19}$ | $CH_3$ |
| $D_{12}$ | $C_7H_{18}$ | $C_9H_{19}O$ | H | $Y_4$ | $C_5H_{11}$ | $C_4H_9$ | $CH_3$ |
| | | | | $Y_5$ | $C_5H_{11}$ | $C_7H_{15}$ | $CH_3$ |
| $E_1$ | $CH_3O$ | $C_2H_5$ | H | $Y_6$ | $C_7H_{15}$ | $C_3H_7$ | $CH_3$ |
| $E_2$ | $CH_3O$ | $C_4H_9$ | H | $Y_7$ | $C_8H_{17}$ | $C_8H_{17}$ | $CH_3$ |
| $E_3$ | $C_3H_7O$ | $C_8H_{17}$ | H | $Y_8$ | $C_2H_5O$ | $C_4H_9$ | $CH_3$ |
| $E_4$ | $C_4H_9O$ | $C_4H_9$ | H | $Y_9$ | $C_3H_7O$ | $C_5H_{11}$ | $CH_3$ |
| $E_5$ | $C_4H_9O$ | $C_6H_{13}$ | H | $Y_{10}$ | $C_6H_{13}O$ | $CH_3$ | $CH_3$ |
| $E_6$ | $C_6H_{13}O$ | $C_8H_{17}$ | H | $Y_{11}$ | $C_5H_{11}COO$ | $C_5H_{11}$ | $CH_3$ |
| $E_7$ | $C_8H_{17}O$ | $C_3H_7$ | H | $Y_{12}$ | $C_4H_9OCOO$ | $C_5H_{11}$ | $CH_3$ |
| $E_8$ | $C_3H_7O$ | $C_5H_{11}$ | H | $Y_{13}$ | $C_6H_{13}OCOO$ | $C_5H_{11}$ | $CH_3$ |

Also, preferred examples of the liquid cystal materials represented by the general formula (3) are shown in the following Table 3.

Table 3

$R_4$—⟨◯⟩—COO—⟨◯(R_5)⟩—COO—⟨◯⟩—CN  Type Materials

| Material | $R_4$ | $R_5$ |
|---|---|---|
| $X_1$ | $C_3H_7$ | H |
| $X_2$ | $C_5H_{11}$ | H |
| $X_3$ | $C_8H_{17}$ | H |
| $X_4$ | $C_4H_7O$ | H |
| $X_5$ | $C_3H_7$ | $CH_3$ |
| $X_6$ | $C_5H_{11}$ | $CH_3$ |
| $X_7$ | $C_6H_{13}$ | $CH_3$ |
| $X_8$ | $C_7H_{15}$ | $CH_3$ |
| $X_9$ | $C_6H_{13}O$ | $CH_3$ |
| $X_{10}$ | $C_6H_{13}COO$ | $CH_3$ |
| $X_{11}$ | $C_7H_{15}COO$ | $CH_3$ |

Preferred examples of the liquid crystal materials represented by the general formula (4) are shown in the following Table 4.

Table 4

$R_6$—⟨◯⟩—COO—⟨◯⟩—$R_7$  Type Materials

| Material | $R_6$ | $R_7$ | Material | $R_6$ | $R_7$ |
|---|---|---|---|---|---|
| $H_1$ | $CH_3O$ | CN | $J_1$ | CN | $CH_3O$ |
| $H_2$ | $C_2H_5O$ | CN | $J_2$ | CN | $C_4H_9O$ |
| $H_3$ | $C_3H_7O$ | CN | $J_3$ | CN | $C_5H_{11}O$ |
| $H_4$ | $C_4H_9O$ | CN | $J_4$ | CN | $C_6H_{13}O$ |
| $H_5$ | $C_5H_{11}O$ | CN | $J_5$ | CN | $C_7H_{15}O$ |
| $H_6$ | $C_6H_{13}O$ | CN | $J_6$ | CN | $C_8H_{17}O$ |
| $H_7$ | $C_7H_{15}O$ | CN | $J_7$ | CN | $C_9H_{19}O$ |
| $H_8$ | $C_9H_{19}O$ | CN | | | |
| | | | $K_1$ | CN | $C_3H_7$ |
| $I_1$ | $C_3H_7$ | CN | $K_2$ | CN | $C_4H_9$ |
| $I_2$ | $C_4H_9$ | CN | $K_3$ | CN | $C_5H_{11}$ |
| $I_3$ | $C_5H_{11}$ | CN | $K_4$ | CN | $C_6H_{13}$ |
| $I_4$ | $C_7H_{15}$ | CN | $K_5$ | CN | $C_7H_{15}$ |
| $I_5$ | $C_8H_{17}$ | CN | $K_6$ | CN | $C_8H_{17}$ |
| $I_6$ | $C_9H_{19}$ | CN | $K_7$ | CN | $C_9H_{19}$ |

Table 4-continued $R_6$—⟨◯⟩—COO—⟨◯⟩—$R_7$  Type Materials

| Material | $R_6$ | $R_7$ | Material | $R_6$ | $R_7$ |
|---|---|---|---|---|---|
| $I_7$ | $C_{10}H_{22}$ | CN | $K_8$ | CN | $C_{10}H_{21}$ |
| $W_1$ | $C_5H_{11}OCOO$ | CN | | | |
| $W_2$ | $C_6H_{13}OCOO$ | CN | | | |
| $W_3$ | $C_7H_{15}OCOO$ | CN | | | |
| $W_4$ | $C_8H_{15}OCOO$ | CN | | | |
| $W_5$ | $C_5H_{11}COO$ | CN | | | |
| $W_6$ | $C_6H_{13}COO$ | CN | | | |
| $W_7$ | $C_7H_{13}COO$ | CN | | | |
| $W_8$ | $C_8H_{17}COO$ | CN | | | |

Preferred examples of the liquid crystal materials represented by the general formula (5) are shown in the following Table 5.

Table 5

$R_8$—⟨◯⟩—COO—⟨◯⟩—$R_9$  Type Materials

| Material | $R_8$ | $R_9$ | Material | $R_8$ | $R_9$ |
|---|---|---|---|---|---|
| $L_1$ | $CH_3O$ | $C_4H_9$ | $L_{23}$ | $C_5H_{11}COO$ | $C_2H_5O$ |
| $L_2$ | $C_2H_5O$ | $C_6H_{13}$ | $L_{24}$ | $C_3H_7COO$ | $C_6H_{13}O$ |
| $L_3$ | $C_3H_7O$ | $C_7H_{15}$ | $L_{25}$ | $C_6H_{13}COO$ | $C_4H_9O$ |
| $L_4$ | $C_5H_{11}O$ | $C_5H_{11}$ | $L_{27}$ | $C_8H_{17}COO$ | $C_2H_5O$ |
| $L_5$ | $C_6H_{13}O$ | $C_8H_{17}$ | $L_{28}$ | $C_5H_{11}O$ | $CH_3COO$ |
| $L_6$ | $C_7H_{15}O$ | $C_{10}H_{21}$ | $L_{29}$ | $C_5H_{11}O$ | $C_2H_5COO$ |
| $L_7$ | $C_8H_{17}O$ | $C_2H_5$ | $L_{30}$ | $C_2H_5$ | $C_7H_{15}COO$ |
| $L_8$ | $C_2H_5$ | $C_8H_{17}O$ | $L_{31}$ | $C_4H_9OCOO$ | $C_6H_{13}O$ |
| $L_9$ | $C_3H_7$ | $C_5H_{11}O$ | $L_{32}$ | $C_5H_{11}OCOO$ | $CH_3O$ |
| $L_{10}$ | $C_4H_9$ | $CH_3O$ | $L_{33}$ | $C_7H_{15}OCOO$ | $C_2H_5O$ |
| $L_{11}$ | $C_4H_9$ | $C_6H_{13}O$ | $L_{34}$ | $C_6H_{13}O$ | $C_3H_7OCOO$ |
| $L_{12}$ | $C_5H_{11}$ | $C_4H_9O$ | $L_{35}$ | $C_2H_5O$ | $C_6H_{13}OCOO$ |
| $L_{13}$ | $C_5H_{11}$ | $C_{10}H_{21}O$ | $L_{36}$ | $C_3H_7O$ | $C_8H_{17}OCOO$ |
| $L_{14}$ | $C_6H_{13}$ | $C_6H_{13}O$ | | | |
| $L_{15}$ | $C_8H_{17}$ | $C_2H_5O$ | | | |
| $L_{16}$ | $CH_3O$ | $C_5H_5O$ | | | |
| $L_{17}$ | $C_2H_5O$ | $C_5H_{11}O$ | | | |
| $L_{18}$ | $C_4H_9O$ | $C_4H_9O$ | | | |
| $L_{19}$ | $C_4H_9O$ | $C_6H_{13}O$ | | | |
| $L_{20}$ | $C_5H_{11}O$ | $C_6H_{13}O$ | | | |
| $L_{21}$ | $C_6H_{13}O$ | $C_3H_7O$ | | | |

Table 5-continued $R_8$—⟨O⟩—COO—⟨O⟩—$R_9$ Type Materials

| Material | $R_8$ | $R_9$ | Material | $R_8$ | $R_9$ |
|---|---|---|---|---|---|
| $L_{22}$ | $C_6H_{13}O$ | $C_8H_{17}O$ | | | |

Preferred examples of the liquid crystal materials represented by the general formula (6) are shown in the following Table 6.

Table 6

$R_{10}$—⟨O⟩—CH=N—⟨O⟩—$R_{11}$ Type Materials

| Materials | $R_{10}$ | $R_{11}$ | Material | $R_{10}$ | $R_{11}$ |
|---|---|---|---|---|---|
| $M_1$ | $CH_3O$ | CN | $P_1$ | CN | $OCH_3$ |
| $M_2$ | $C_2H_5O$ | CN | $P_2$ | CN | $OC_2H_5$ |
| $M_3$ | $C_4H_9O$ | CN | $P_3$ | CN | $OC_4H_9$ |
| $M_4$ | $C_5H_{11}O$ | CN | $P_4$ | CN | $OC_6H_{13}$ |
| $M_5$ | $C_6H_{13}O$ | CN | $P_5$ | CN | $OC_7H_{15}$ |
| $M_6$ | $C_7H_{15}O$ | CN | $P_6$ | CN | $OC_8H_{17}$ |
| $M_7$ | $C_8H_{17}O$ | CN | $Q_1$ | CN | $C_3H_7$ |
| $M_8$ | $C_{10}H_{21}O$ | CN | $Q_2$ | CN | $C_4H_9$ |
| $N_1$ | $C_2H_5COO$ | CN | $Q_3$ | CN | $C_5H_{11}$ |
| $N_2$ | $C_3H_7COO$ | CN | $Q_4$ | CN | $C_6H_{13}$ |
| $N_3$ | $C_4H_9COO$ | CN | $Q_5$ | CN | $C_7H_{15}$ |
| $N_4$ | $C_5H_{11}COO$ | CN | $Q_6$ | CN | $C_8H_{17}$ |
| $N_5$ | $C_6H_{13}COO$ | CN | $Q_7$ | CN | $C_{10}H_{21}$ |
| $N_6$ | $C_7H_{15}COO$ | CN | $R_1$ | CN | $C_2H_5COO$ |
| $N_7$ | $C_9H_{19}COO$ | CN | $R_2$ | CN | $C_4H_9COO$ |
| $O_1$ | $C_3H_7$ | CN | $R_3$ | CN | $C_5H_{11}COO$ |
| $O_2$ | $C_4H_9$ | CN | $R_4$ | CN | $C_7H_{15}COO$ |
| $O_3$ | $C_5H_{11}$ | CN | $R_5$ | CN | $C_8H_{17}COO$ |
| $O_4$ | $C_6H_{13}$ | CN | | | |
| $O_5$ | $C_7H_{15}$ | CN | | | |
| $O_6$ | $C_8H_{17}$ | CN | | | |

Preferred examples of the liquid crystal materials represented by the general formula (7) are shown in the following Table 7.

Table 7

$R_{12}$—⟨O⟩—N=N(O)—⟨O⟩—CN Type Material

| Material | $R_{12}$ | Material | $R_{12}$ |
|---|---|---|---|
| $S_1$ | $C_3H_7$ | $U_1$ | $C_3H_7COO$ |
| $S_2$ | $C_4H_9$ | $U_2$ | $C_5H_{11}COO$ |
| $S_3$ | $C_5H_{11}$ | $U_3$ | $C_6H_{13}COO$ |
| $S_4$ | $C_6H_{13}$ | $U_4$ | $C_7H_{15}COO$ |
| $S_5$ | $C_7H_{15}$ | $U_5$ | $C_8H_{17}COO$ |
| $S_6$ | $C_8H_{17}$ | $U_6$ | $C_{10}H_{21}COO$ |
| $S_7$ | $C_{10}H_{21}$ | $V_1$ | $CH_3OCO$ |
| $T_1$ | $CH_3O$ | $V_2$ | $C_3H_7OCO$ |
| $T_2$ | $C_2H_5O$ | $V_3$ | $C_4H_9OCO$ |
| $T_3$ | $C_3H_7O$ | $V_4$ | $C_5H_{11}OCO$ |
| $T_4$ | $C_4H_9O$ | $V_5$ | $C_6H_{13}OCO$ |
| $T_5$ | $C_5H_{11}O$ | $V_6$ | $C_8H_{17}OCO$ |
| $T_6$ | $C_6H_{13}O$ | | |
| $T_7$ | $C_7H_{15}O$ | | |
| $T_8$ | $C_8H_{17}O$ | | |

PREFERRED EXAMPLES

In order to enable persons skilled in the art to reduce the present invention into practice, the following preferred examples are presented. It should, however, be noted that these examples are illustrative only, and they do not intend to limit the scope of the present invention as set forth in the appended claims.

EXAMPLE 1

60% by weight of the material $A_2$ and 40% by weight of the material $A_4$ as shown in Table 1 above were mixed together to prepare a mixed biphenyl type liquid crystal (hereinafter abbreviated as "mixed liquid crystal B-I"). On the other hand, 50% by weight of the material $C_4$ and 50% by weight of the material $E_2$ as shown in Table 2 above were mixed to prepare a mixed carboxylic acid ester type liquid crystal (hereinafter abbreviated as "mixed liquid crystal C-I"). These two types of mixed liquid crystals were further mixed together, and the mesomorphic range (M.R.) of such mixed liquid crystalline composition was measured, the result of which is as shown by solid lines a in FIG. 4.

Figure 4:
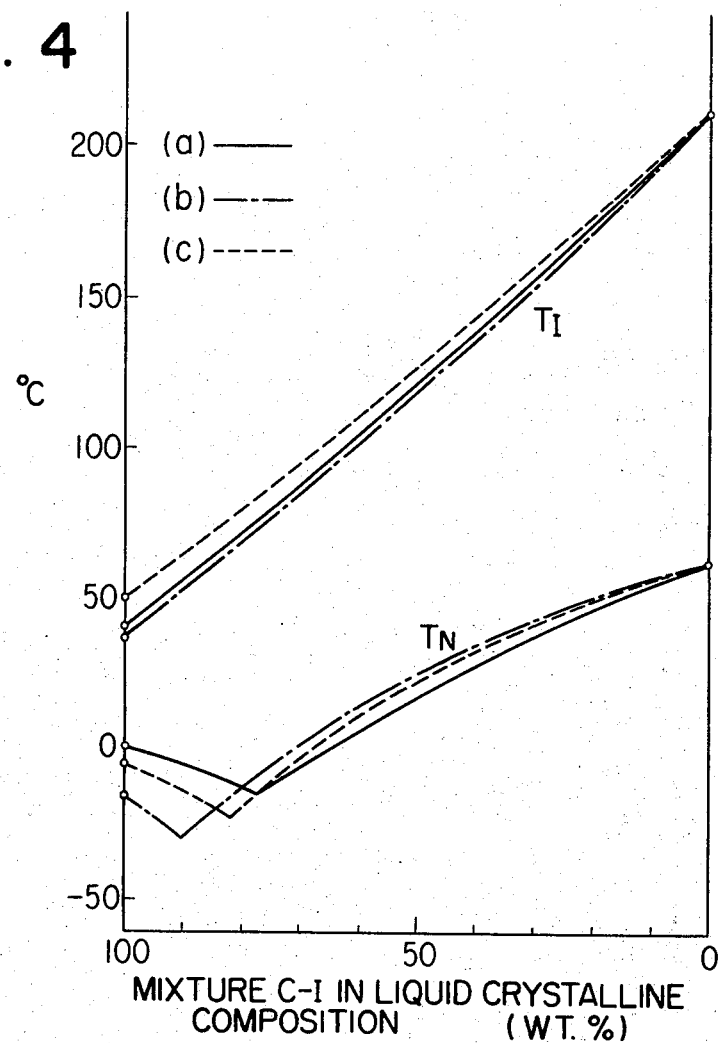
FIGS. 4 and 6 through 12 are graphical representations respectively showing the results of measurement of the mesomorphic range (M.R.) of the liquid crystalline composition according to the present invention obtained by changing the compositional ratio.

As will be apparent from FIG. 4, the liquid crystalline composition thus obtained was found to have a very wide range of M.R.

Substantially the same results were obtained, even when the mixing ratio of the material $A_2$ and $A_4$, and the mixing ratio of the materials $C_4$ and $E_2$ were varied.

EXAMPLE 2

In place of the biphenyl type mixed liquid crystal B-I as used in Example 1 above, there were used various biphenyl type mixed liquid crystals as shown in Table 8 below, and the variations in the mesomorphic range (M.R.) were measured.

The measured M.R. of the liquid crystalline composition prepared by the mixed liquid crystal B-IX and the mixed liquid crystal C-I is shown in FIG. 4 by chain lines b, and the measured M.R. of the liquid crystalline composition prepared by the mixed liquid crystal B-XIV and the mixed liquid crystal C-I is shown by the dotted lines c.

Table 8

| Biphenyl Type Mixed Liquid Crystal | Mixing Ratio | M.R. (° C) |
|---|---|---|
| B-II | $A_2:A_3 = 3:2$ | −3 to 30 |
| B-III | $A_3:A_4 = 2:3$ | 0 to 35 |
| B-IV | $A_4:A_5 = 2:1$ | 17 to 40 |
| B-V | $A_1:A_2:A_4 = 4:3:9$ | 5 to 36 |
| B-VI | $A_3:A_4:A_5 = 9:2:4$ | −5 to 32 |
| B-VII | $A_2:A_3:A_4 = 9:2:6$ | −6 to 32.5 |
| B-VIII | $A_2:A_4:A_7 = 5:3:2$ | −6.5 to 41 |
| B-IX | $A_2:A_3:A_4:A_5 = 3:2.5:2:2.5$ | −16 to 36 |
| B-X | $B_2:B_4 = 3:2$ | 30 to 70 |
| B-XI | $B_3:B_4 = 1:1$ | 35 to 75.5 |
| B-XII | $A_2:A_4:B_2:B_4 = 5:3:1:1$ | −5 to 45 |
| B-XIII | $A_2:B_2:B_4:B_5 = 3:1:1:1$ | 0 to 56 |
| B-XIV | $A_2:A_4:B_2:B_4:B_5 = 5:3:1:1:2$ | −4 to 51 |

EXAMPLE 3

On one of two sheets of glass base, there was formed by vacuum evaporation a mosaic display electrode of $In_2O_3$ in the form of a numerical figure "8," while on the other glass base, there was formed by vacuum evaporation an opposite electrode of $In_2O_3$. Thereafter, both glass bases were rubbed with cotton cloth in one definite direction on the surface side where the electrode is formed. After completion of such treatment, the two sheets of the glass base were arranged in such a manner that the rubbing direction of each sheet was orthogonally intersected, and the surfaces where the electrode was formed were opposed to each other to constitute the inner side with a Myler spacer of 6 microns in thickness having been interposed therebetween. Subsequent to such arrangement of the glass bases, the combination was sealed with an epoxy resin with the exception of the liquid crystal pouring port which is left open, whereby a liquid crystal display cell was produced. Into a cavity formed in the thus produced liquid crystal display cell, there was filled a liquid crystalline composition consisting of 75% by weight of the mixed liquid crystal B-IV and 25% by weight of the mixed liquid crystal composed of the materials $C_2$, $C_4$ and $E_{10}$ at a mixing ratio of 1:1:1 respectively (the measured M.R. of this liquid crystalline composition was from $-8°$ to $75°$ C.), after which the entire cell was tightly sealed with the epoxy resin to perfect it into a TN type liquid crystal display cell.

Figure 5:
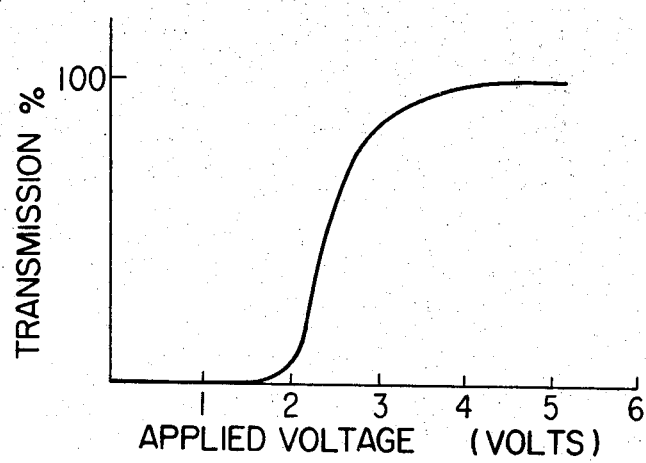
FIG. 5 is a graphical representation showing the relationship between applied voltage and transmission when voltage is impressed on a $T_N$ type liquid crystal display cell using the liquid crystalline composition according to the present invention.

This liquid crystal display cell was placed between a pair of cross-nicols and variations in light transmission with respect to variations in the applied voltage were measured. The results of the measurements are shown in FIG. 5.

Separately, there was conducted 8-place dynamic driving by use of the $\frac{1}{3}$V method, wherein an a.c. rectangular wave of 3V and 150 Hz was impressed on the display cell. It was found out that the contrast in the display was extremely high, and yet there was no cross-talk at all.

Further, continuous electric conduction was performed by applying alternating current of 6 V. The initial performance of the display cell could be maintained even after a lapse of three and a half years.

EXAMPLE 4

In place of the carboxylic acid ester type mixed liquid crystal C-I used in Example 1 above, there were used various kinds of carboxylic acid ester type mixed liquid crystals as shown in Table 9 below, and the measurements of the M.R. were conducted.

Table 9

| Carboxylic Acid Ester Type Mixed Liquid Crystal | Mixing Ratio | M.R. (° C) |
|---|---|---|
| C-II | $C_1 : C_4 = 1 : 1$ | 45 to 180 |
| C-III | $C_1 : D_1 = 3 : 2$ | 60 to 199 |
| C-IV | $C_4 : F_5 = 1 : 1$ | 60 to 198 |
| C-V | $D_2 : D_6 = 3 : 2$ | 58 to 190 |
| C-VI | $D_6 : E_4 = 3 : 2$ | 55 to 196 |
| C-VII | $D_6 : F_2 = 3 : 2$ | 61 to 193 |
| C-VIII | $E_4 : F_2 = 1 : 1$ | 65 to 217 |
| C-IX | $C_4:D_1:E_4 = 5:3:2$ | 40 to 200 |
| C-X | $F_2:G_1:G_4 = 3:3:4$ | 57 to 218 |
| C-XI | $C_1:E_1:E_2 = 2:1:1$ | 38 to 205 |

The following Table 10 indicates the values of M.R. of the principal liquid crystalline compositions prepared by using some of the carboxylic acid ester type mixed liquid crystals of Table 9 above. As will be clear from this Table 10, the liquid crystalline composition of the present invention possesses an value M.R. sufficiently adapted for practical use.

Table 10

| Composition Ratio | M.R. (° C) |
|---|---|
| B-I : C-III = 4 : 1 | $-10$ to 75 |
| B-I : C-VI = 3 : 1 | $-15$ to 78 |
| B-I : C-VIII = 17 : 3 | $-8$ to 70 |
| B-I : C-IX = 13 : 7 | $-22$ to 96 |
| B-I : C-X = 3 : 2 | $-15$ to 101 |

EXAMPLE 5

Figure 6:
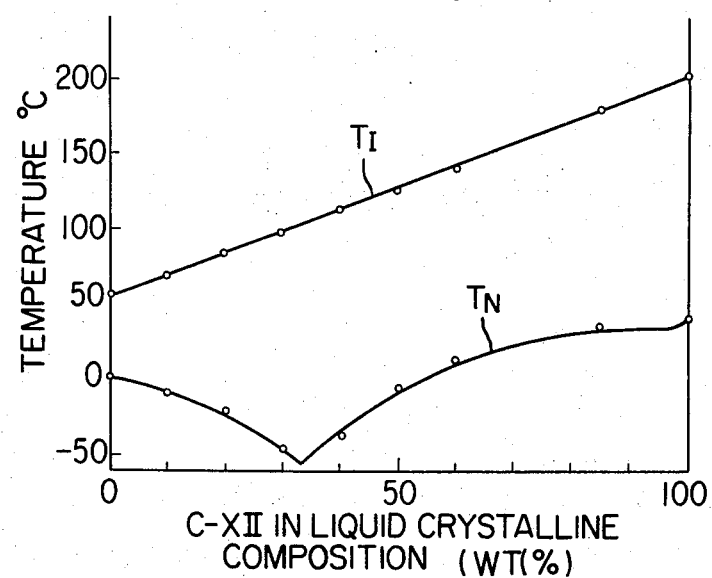

A biphenyl type mixed liquid crystal E-3, a trademark for the product of Merck & Co., consisting of a liquid crystal material of the general formula (1) wherein R is an alkyl group and another liquid crystal material of the general formula (1) wherein R is an alkoxy group and a carboxylic acid ester type mixed liquid crystal (hereinafter abbreviated as "mixed liquid crystal C-XII") consisting of the materials $C_1$, $E_1$ and $E_2$ at a mixing ratio of 2:1:2 respectively were mixed to prepare a mixed liquid crystalline composition. Then, the M.R. of this mixed liquid crystalline composition was measured, the results of which are indicated in FIG. 6 in the form of a phase chart.

As is apparent from the graphical representation, the liquid crystalline composition according to the present invention has a wide range of the M.R., hence it is superior in quality.

EXAMPLE 6

A TN type liquid crystal cell was manufactured in the manner as described in Example 3 above by using a mixed liquid crystalline composition (M.R. = $-10°$ to $82°$ C.) consisting of the materials $A_2$, $A_4$ $C_4$, and $E_2$ at the respective mixing ratio of 4.2:2.8:1.5:1.5 Thereafter, the dynamic driving was conducted with the liquid crystal cell. It was found out that the satisfactory driving could be carried out successfully without changing the electric voltage to be applied within a practical temperature range of from 0° to 40° C.

Further, the cell was continuously left at a temperature condition of $-10°$ C. and 60° C., respectively, to examine its temperature reliability. It was discovered that, even after lapse of four months, there took place no change at all in its performance, and the favorable state at the initial stage of its operation was maintained.

EXAMPLE 7

As the result of continuous electric conduction of alternating current at 5 volts through the liquid crystal cell produced in Example 6, it could be verified that there took place no change in its performance from the initial stage even after a lapse of half a year, and that sufficient reliability in its service life was warrantable.

EXAMPLE 8

A liquid crystalline composition was prepared by mixing the mixed liquid crystal B-I, and another mixed liquid crystal (hereinafter abbreviated as "mixed liquid crystal C-XIII") consisting of 33% by weight of 4-methoxy benzoic acid-butyl phenyl ester (material $L_1$), 14% by weight of 4-butyl-benzoic acid-methoxy phenyl ester (material $L_{10}$), 28% by weight of 4-(4-butylbenzoyloxy) benzoic acid-butylphenyl ester (material $C_4$), and 25% by weight of 4-(4-methoxybenzoyloxy) benzoic acid-butylphenyl ester (material $E_2$).

Figure 7:
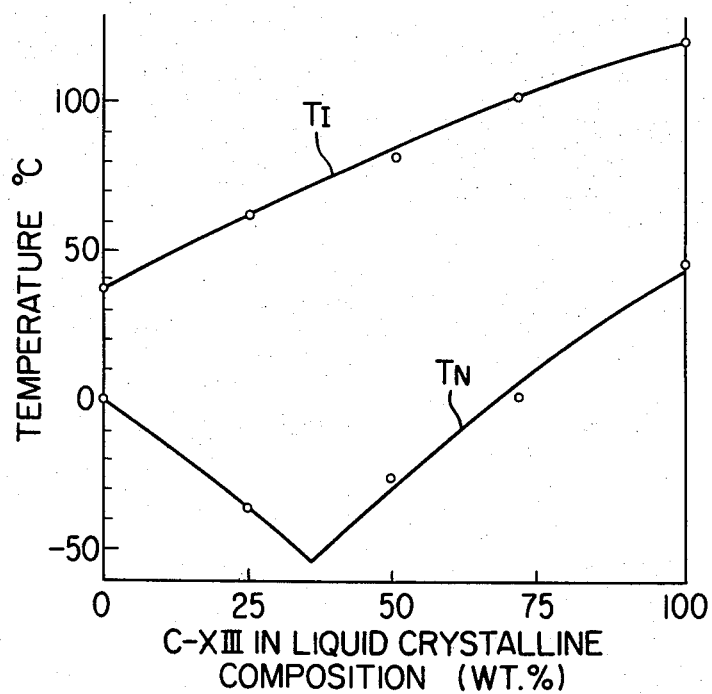

The mesomorphic range (M.R.) of this liquid crystalline composition as measured is as shown in FIG. 7. As is apparent from this graphical representation, the liquid crystalline composition possesses its M.R. values of from $-30°$ to 70° C.

EXAMPLE 9

A liquid crystalline composition was prepared by mixing the mixed liquid crystal B-I, and another mixed liquid crystal (hereinafter abbreviated as "mixed liquid crystal C-XIV") consisting of 66.7% by weight of 4-methoxybenzoic acid-cyanophenyl ester (material $H_1$) and 33.3% by weight of 4-butyl benzoic acid-cyanophenyl ester (material $I_2$).

Figure 8:
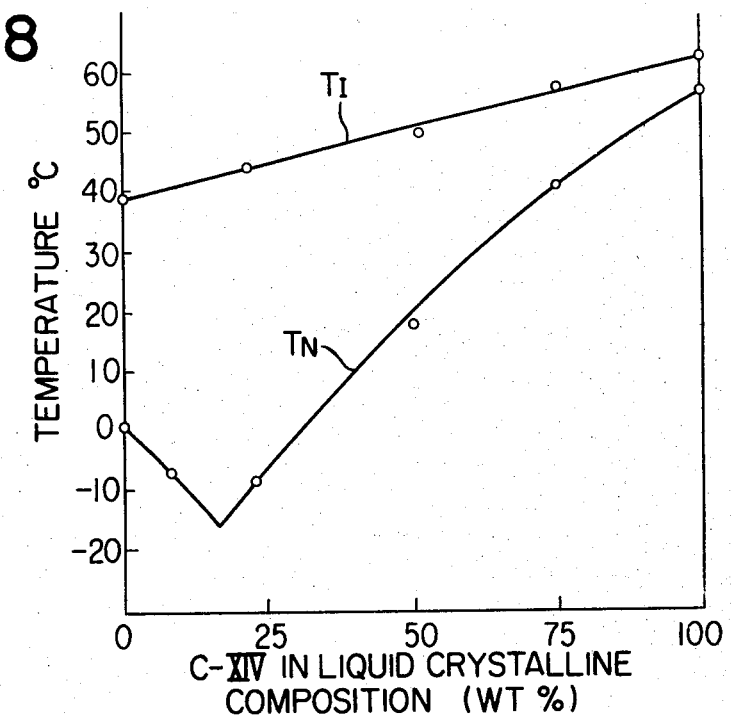

The mesomorphic range (M.R.) of this liquid crystalline composition as measured is as shown in FIG. 8.

As is apparent from this graphical representation, the liquid crystalline composition according to the present invention has sufficiently wide mesomorphic range, and exhibits the nematic liquid crystal phase at a low temperature region. It was also found out that the liquid crystalline composition has very good miscibility, for the proof of which there took place no separation and deposition of the component liquid crystals, even when the liquid crystalline composition was left at a low temperature condition.

EXAMPLE 10

The liquid crystalline composition according to the present invention which consists of the mixed liquid crystal C-XIII and the mixed liquid crystal B-I was processed into the TN type liquid crystal display cell by rubbing two sheets of $In_2O_3$ electrodes on the glass bases in accordance with the above-described method in Example 3.

Then, this liquid crystal display cell was subjected to voltage application with an alternating current of 5 volts and its leading time ($\tau_R$) and trailing time ($\tau_D$) of the voltage response were measured, the results of which are shown in the following Table 11. For the sake of comparison, the measured values of both mixed liquid crystals C-XIII and B-I are also shown in the Table.

Table 11

| Specimen | Weight Ratio Between C-XIII and B-I | $\tau_R$ (msec) | $\tau_D$ (msec) |
|---|---|---|---|
| Comparative | B-I alone | 50 | 300 |
| Example | C-XIII alone | 300 | 1500 |
| Example I | 1 : 3 | 50 | 300 |
| Example II | 1 : 1 | 80 | 600 |
| Example III | 3 : 1 | 120 | 1200 |

It will be clear from the above Table 11 that the TN type liquid crystal display cell using the liquid crystalline composition according to the present invention is excellent in voltage response. Also, when continuous electric conduction was carried out with alternating current of 6 volts, the cell worked satisfactorily maintaining its initial performance without any deterioration whatsoever.

EXAMPLE 11

In the same manner as in Example 10 above, the TN type liquid crystal display cell was manufactured using the liquid crystalline composition consisting of the mixed liquid crystal C-XIV and the mixed liquid crystal B-I. The measured results of $\tau_R$ and $\tau_D$ thereof are shown in the following Table 12.

Table 12

| Specimen | Weight Ratio Between C-XIV and B-I | $\tau_R$ (msec) | $\tau_D$ (msec) |
|---|---|---|---|
| Comparative | C-XIV alone | 500 | 1200 |
| Examples | B-I alone | 50 | 300 |
| Example IV | 1 : 3 | 90 | 450 |
| Example V | 1 : 1 | 100 | 700 |
| Example VI | 3 : 1 | 200 | 1000 |

As shown in the above Table 12, the liquid crystalline composition of the present invention is found to be superior in its voltage response as compared to a single body of the carboxylic acid ester type liquid crystal.

Furthermore, even when the continuous electric conduction was carried out for a long period of time by applying an alternating current of 6 volts to the display cell, there could be observed no deterioration in its performance.

EXAMPLE 12

The M.R. measurements were conducted with respect to the liquid crystalline compositions consisting of the components as shown in Table 13 below. The measured results were such that the mesomorphic range (M.R.) was very broad, the nematic liquid crystal phase was exhibited even at a low temperature region, and the degree of overcooling was also high.

Further, by using these liquid crystalline compositions, the TN type liquid crystal display cells were manufactured in the same manner as in Example 10, of which the voltage response was measured. Excellent results were obtained.

Table 13

| Components Constituting Liquid Crystalline Composition (weight Ratio) | M.R. (° C) |
|---|---|
| $A_2(3):B_2(1):B_4(1):B_5(1):C_1(0.6):D_6(0.6):L_{21}(0.3)$ | −7 to 77 |
| $B_2(8.8):B_4(8.8):F_1(2.2):F_4(2.2):L_{11}(2):L_{13}(1)$ | 9 to 101 |
| $A_2(14):A_4(9.3):C_2(3):C_4(3):E_2(3):L_{17}(1)$ | −18 to 87 |
| $A_2(20.4):A_4(13.6):A_7(6):C_3(5.4):E_5(3.6):L_{18}(1)$ | −12 to 68 |
| $A_2(40):B_2(13):B_4(13):B_5(13):L_{23}(18):L_{28}(1):L_{29}(1)$ | −5 to 67 |

EXAMPLE 13

A liquid crystalline composition was prepared from the mixed liquid crystal B-I and a benzylidene type mixed liquid crystal (hereinafter referred to as "D-I") consisting of 66.7% by weight of 4'-n-butylbenzylidene-4-cyanoaniline (material $O_2$) and 33.3% by weight of 4'-cyanophenylazomethine-4-phenyloctanoate (material $N_6$).

Figure 9:
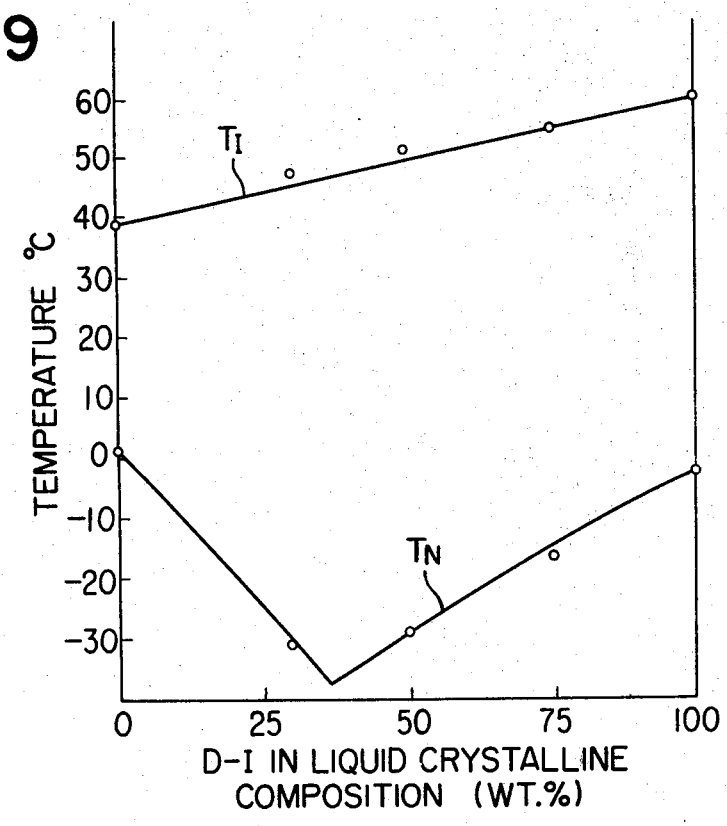

The M.R. of this liquid crystalline composition was measured, the results of which are shown in FIG. 9.

It can be noted that, in this type of the liquid crystalline composition, the M.R. value at the low temperature side is particularly improved, and the liquid crystalline composition having the M.R. values of from −20° to 50° C. or so can be obtained easily.

These mixed liquid crystalline compositions were found to have a high degree of overcooling, and could maintain the liquid crystal phase even after lapse of a week at a temperature of −20° C., or, depending on the mixing ratio, it could exhibit the liquid crystal phase for two to three days at a temperature of as low as −40° C.

EXAMPLE 14

The mixed liquid crystal B-I used in Example 13 above and a liquid crystal material represented by the general formula (6) were mixed at a weight ratio of 3:2. The thus obtained liquid crystalline composition was then subjected to measurement for its M.R., the results of which are shown in the following Table 14.

Table 14

| Biphenyl Type Mixed Liquid Crystal | Mixed Ratio with Benzylidene Type Mixed Liquid Crystal | M.R. (° C) |
|---|---|---|
| B-I | $M_3 : M_5 = 9 : 11$ | −15 to 64 |
| " | $N_6 : M_4 = 3 : 2$ | −20 to 63 |
| " | $P_4 : M_8 = 1 : 1$ | −6 to 63.5 |
| " | $M_1 : M_2 : O_1 = 1 : 1 : 1$ | −10 to 64 |

As will be apparent from the above Table 14, the liquid crystalline composition according to the present invention has a wide mesomorphic range (M.R.) and exhibits the excellent nematic liquid crystal phase even at a low temperature level.

EXAMPLE 15

A benzylidene type mixed liquid crystal (hereinafter referred to as "D-II") consisting of 60% by weight of the material $N_6$ and 40% by weight of the material $M_4$, and the biphenyl type mixed liquid crystals represented by the general formula (1), and as listed in Table 8 were mixed together at the weight ratio of 3:7 to obtain a liquid crystalline composition. The measured values of M.R. of these liquid crystalline compositions are as shown in the following Table 15.

Table 15

| Benzylidine Type Mixed Liquid Crystal | Biphenyl Type Mixed Liquid Crystal | M.R. (° C) |
|---|---|---|
| D-II | B-IV | 3 to 60 |
| " | B-VII | −12 to 60 |
| " | B-X | 5 to 80 |
| " | B-XII | −10 to 68 |

EXAMPLE 16

A TN type liquid crystal display cell was manufactured by rubbing two sheet of $In_2O_3$ electrodes and in the presence of a liquid crystalline composition prepared by mixing the biphenyl type mixed liquid crystal B-I and the benzylidene type mixed liquid crystal D-I. This display cell was interposed between a pair of polarization plates to measure its response to electric voltage. The results are as shown in Table 16 below.

Table 16

| B-I/D-1 | 1/0 | 3/1 | 1/1 | 1/3 | 0/1 |
|---|---|---|---|---|---|
| $\tau_R$ (msec) | 30 | 25 | 100 | 300 | 600 |
| $\tau_D$ (msec) | 200 | 120 | 400 | 800 | 2000 |

Note: Measuring Conditions
| Temperature | 17° C |
|---|---|
| Applied Voltage | AC 5 volts |
| Spacer Gap | 6 microns |

It will be apparent from the above Table 16 that the voltage response is remarkably improved in comparison with the case where the conventional benzylidene type liquid crystal alone is used.

Furthermore, the display cell was subjected to the continuous electric conduction with alternating current of 6 volts. It was verified that there took place no change at all in its performance over a long period of time.

EXAMPLE 17

The biphenyl type mixed liquid crystal B-I and a mixed liquid crystal (hereinafter referred to as "A-I") consisting of 30% by weight of 4-hexyl-4'-cyanoazoxybenzene (material $U_6$), 30% by weight of 4-heptyl-4'-cyanoazoxybenzene (material $U_7$), and 40% by weight of 4-ethoxy-4'-butylazoxybenzene were mixed to prepare a liquid crystalline composition.

Figure 10:
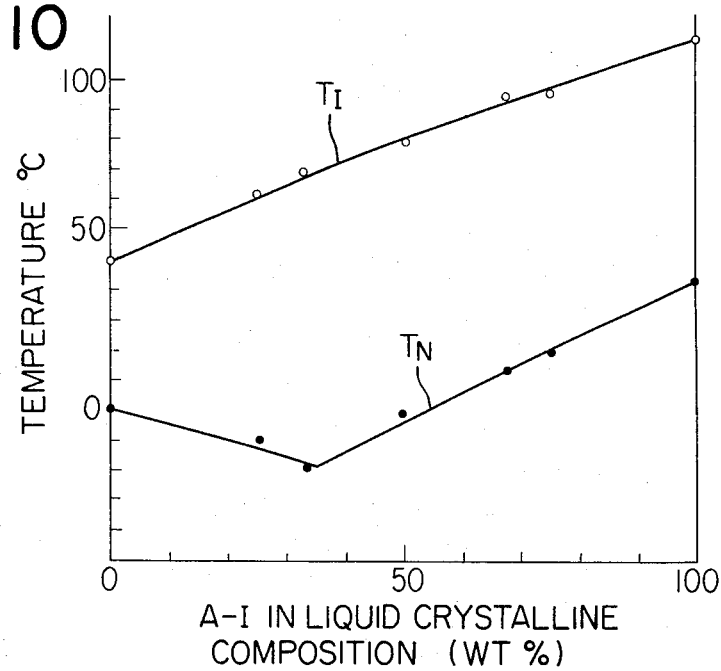

The measured values of M.R. of this liquid crystalline composition are shown in FIG. 10.

EXAMPLE 18

A liquid crystalline composition was prepared by mixing the biphenyl type mixed liquid crystal B-I and $N_P$ type liquid crystal ZLI-319, a trademark for the product of Merck & Co., consisting of azoxy type and ester type liquid crystals.

Figure 11:
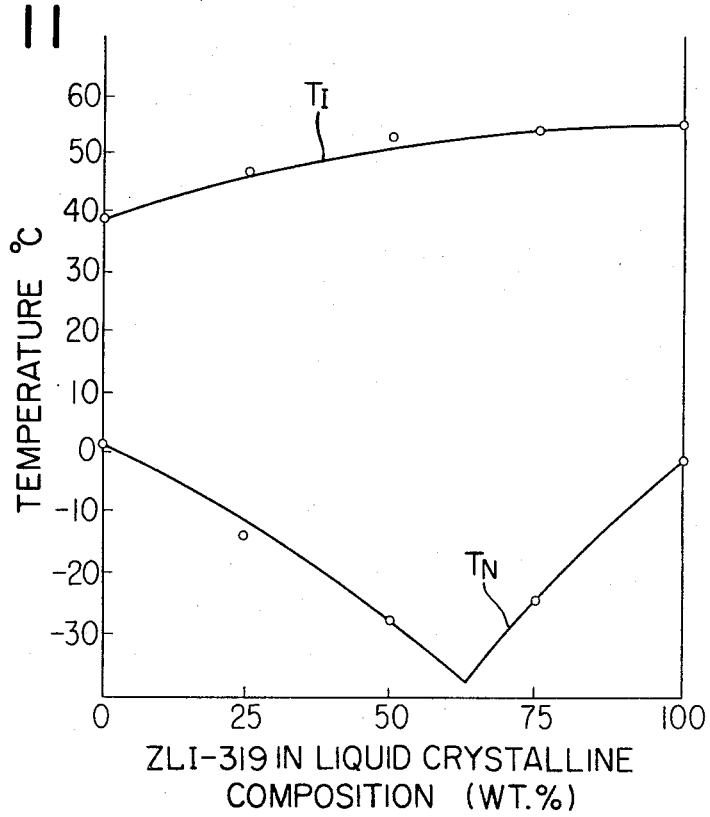

The measured values of M.R. of this liquid crystalline composition are shown in FIG. 11. In this graphical representation, the ordinate represents "temperature (° C.)" and the abscissa denotes "content of ZLI-319 in the liquid crystalline composition (wt.%)".

As is apparent from FIG. 11, the liquid crystalline composition according to the present invention has a very wide mesomorphic range (M.R.) of from −35° C. to 53° C., when the content of the mixed liquid crystal B-I is 35% by weight, for example, and can exhibit the liquid crystal phase even at a low temperature region. Also, it possesses a large degree of overcooling, as proof of which it could maintain such liquid crystal phase for a few days at a temperature of as low as −35° C., when the content of the mixed liquid crystal B-I was, for example, 5% by weight.

EXAMPLE 19

A TN type liquid crystal display cell was manufactured by rubbing two sheets of $In_2O_3$ electrodes in the presence of a liquid crystalline composition prepared by mixing the mixed liquid crystal B-I and another mixed liquid crystal ZLI-319. This display cell was then measured for its leading time $\tau_R$ and trailing time $\tau_D$ of the voltage response, the results of which are as shown in the following Table 17.

Table 17

| Specimen | Weight Ratio Between B-I and ZLI-319 | $\tau_R$ (msec) | $\tau_D$ (msec) |
|---|---|---|---|
| Example VII | 3 : 1 | 80 | 300 |
| Example VIII | 1 : 1 | 60 | 1000 |
| Example IX | 1 : 3 | 80 | 1300 |
| Comparative | B-I alone | 80 | 350 |
| Examples | ZLI-319 alone | 100 | 1500 |

For the sake of comparison, the measured values of B-I and ZLI-319 alone are also shown in the Table. The measuring conditions are as follows: Temperature ... 16° C., Applied voltage ... AC 5 volts, and Spacer Gap ... 6 microns.

Further, when continuous electric conduction was carried out with alternating current of 6 volts, the display cell could maintain the initial state of its operation over a long period of time.

As is apparent from the above Table, the liquid crystalline composition according to the present invention is superior in its voltage response. It has also been found out that the liquid crystalline composition is chemically stable, which enables the continuous electric conduction to be performed over a long period of time.

EXAMPLE 20

Various liquid crystalline compositions as shown in the following Table 18 were prepared, and the same measurements as in Examples 18 and 19 were conducted. It was found out that the liquid crystalline compositions has wide ranges of M.R., were chemically stable, and exhibited the liquid crystal phase at a low temperature region. The liquid crystalline compositions were also proved to be excellent in their voltage response and to have long service life.

Table 18

| Components of Liquid Crystalline Composition (weight ratio) | M.R. (° C) |
|---|---|
| $B_2(3.5):B_4(3.5):U_2(1.2):T_5(0.8):T_8(1)$ | 10 to 88 |
| $A_2(2.3):A_4(1.5):A_5(3.2):U_3(2):T_6(1)$ | 0 to 60 |
| $A_4(3.8):B_2(1.7):B_4(1.5):U_3(1):U_3(1):U_4(1)$ | −5 to 72 |
| $A_4(2.7):A_6(0.7):B_2(2.2):U_3(1):T_6(1):T_7(1)$ | −8 to 76 |

EXAMPLE 21

A liquid crystalline composition was prepared by mixing 75% by weight of the biphenyl type mixed liquid crystal B-XIV and 25% by weight of another mixed liquid crystal consisting of 60% by weight of the material $L_{24}$, 6% by weight of the material $L_{29}$, and 34% by weight of the material C₃. The thus prepared liquid crystalline composition exhibited the nematic liquid crystal phase at a temperature range of from −15° C. to 70° C.

EXAMPLE 22

A liquid crystalline composition was prepared by mixing 60% by weight of the biphenyl type mixed liquid crystal B-I and another mixed liquid crystal consisting of 24% by weight of the material Y₅ and the material Y₁₁. The thus prepared liquid crystalline composition exhibited the nematic liquid crystal phase at a temperature range of from −20° C. to 80° C.

EXAMPLE 23

A liquid crystalline composition was prepared by mixing the mixed liquid crystal C-I and another mixed liquid crystal (hereinafter referred to as "F-I") consisting of 53% by weight of the material A₂, 29% by weight of the material A₄, 12% by weight of the material B₅, and 6% by weight of the material Z₁.

Figure 12:
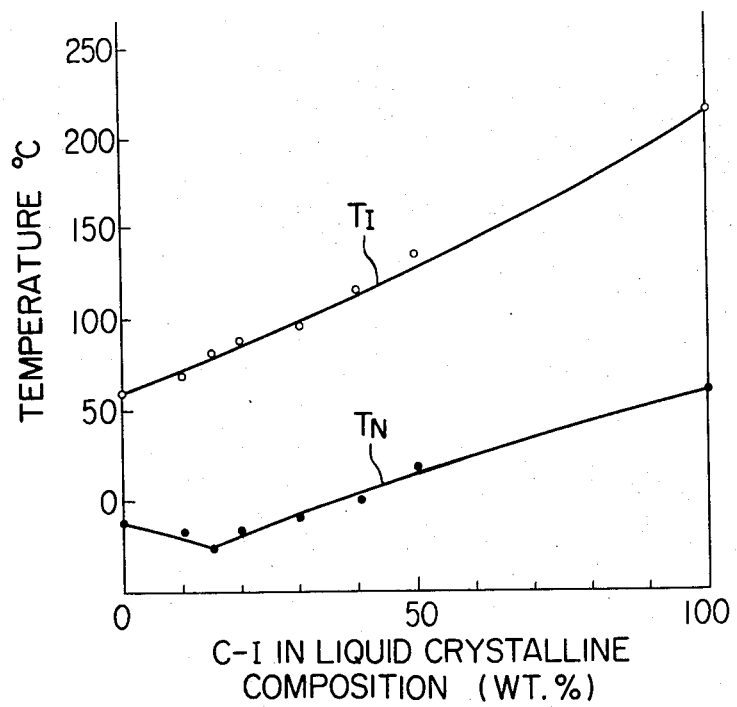

The mesomorphic range (M.R.) of this liquid crystalline composition is shown in FIG. 12.

EXAMPLE 24

Figure 13A:
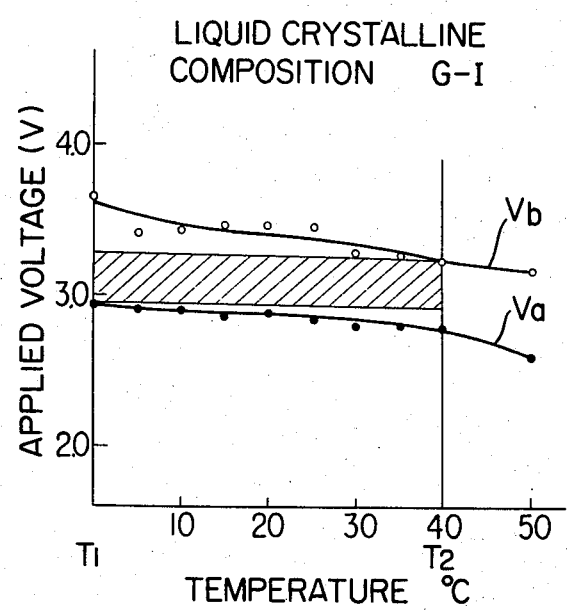
FIG. 13(a) is a graphical representation showing the results of measurements of the marginal change in applied voltage with respect to temperature variations within the mesomorphic range (M.R.) of the liquid crystalline composition according to the present invention.
Figure 13B:
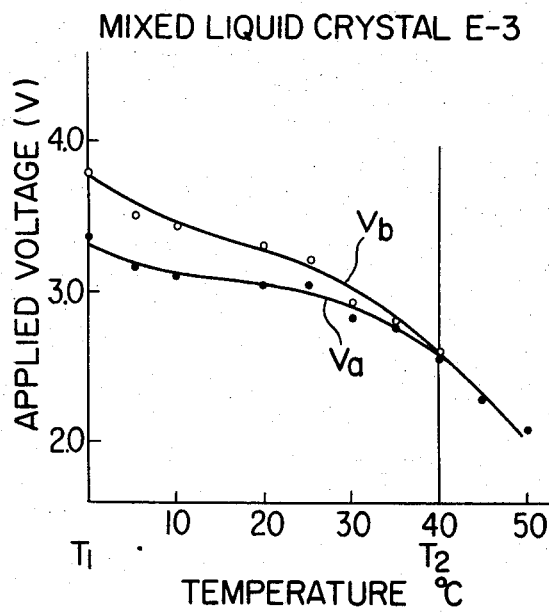
FIG. 13(b) is a graphical representation showing the results of measurements of the marginal change in applied voltage with respect to temperature variations of the conventional liquid crystalline composition.

The temperature margin was measured for each of the liquid crystalline compositions (G-I) consisting of 80% by weight of the biphenyl type mixed liquid crystal B-I used in Example 2 and 20% by weight of the mixed liquid crystal C-I, and the liquid crystal E-3 (product of Merck & Co.) used in Example 4. The results of the measurements are indicated in FIGS. 13(a) and 13(b), respectively.

As is apparent from the drawing, the liquid crystalline composition of the present invention is noted to be excellent in its voltage response.

EXAMPLE 25

A liquid crystalline composition (H) consisting of 56.25% by weight of the material A₂, 18.75% by weight of the material A₄, 16.25% by weight of the material O₂ and 8.75% by weight of the material N₅ was interposed between two sheets of a glass base having an In₂O₃ transparent electrode being 6 microns to manufacture a TN type liquid crystal cell. The percent light transmission of the liquid crystal cell was measured at a ratio of the voltage applying duration to one cycle time, that is, at a duty ratio of 1/1 to 1/10 under the conditions of 100H$_z$ and 5V, the result of which is shown in the Table 19.

As is clear from the result, even at the duty ratio of 1/8 under the conditions of 100H$_z$ and 5V, the liquid crystalline composition (H) exhibits a light transmission of 92%, which shows that the composition (H) makes it possible to conduct 8-place dynamic drive. Also, under the conditions of 1KH$_z$ and 5V, substantially the same result is obtained.

EXAMPLE 26

A liquid crystalline composition (I) consisting of 21% by weight of the material C₄, 21% by weight of the material E₁₀, 16.8% by weight of the material C₂, 18% by weight of the material A₂ and 12% by weight of the material A₄ was prepared and the percent light transmission thereof was measured in the same manner as in Example 25, the result of which is shown in Table 19.

As is apparent from the result, even at the duty ratio of 1/8, the liquid crystalline composition (I) maintained a light transmission of 92% under the conditions of 100H$_z$ and 5V. The fact shows that 8-place dynamic drive can be sufficiently made operable by using the liquid crystalline composition (I).

For the comparison, a liquid crystalline composition (J) having the following composition was prepared.

30% by weight of n-butoxybenzylidene aminophenyl propionate:

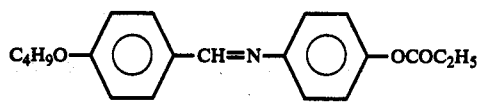

50% by weight of methoxybenzylidene butylaniline:

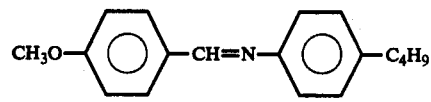

20% by weight of hexyloxybenzylidene cyanoaniline:

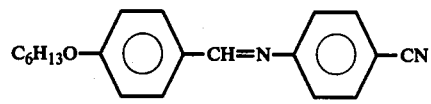

The percent light transmission of the composition (J) was measured in the above-mentioned manner. The result is also shown in Table 19. It exhibited, at most, light transmissions of 18% and 5% at 100H$_z$ and 1KH$_z$, respectively, at the duty ratio of ½ and it was found poor in electro-optical effect. These facts indicate that the liquid crystalline composition (J) cannot be applied to the dynamic drive and it is suitable only for the static drive which has been used in the conventional display device utilizing the dynamic scattering mode.

Table 19

| Duty Ratio | Transmission | | | | | |
|---|---|---|---|---|---|---|
| | Liquid Crystalline Composition (H) | | Liquid Crystalline Composition (I) | | Liquid Crystalline Composition (J) | |
| | 100Hz | 1KHz | 100Hz | 1KHz | 100Hz | 1KHz |
| 1 | 100 | 100 | 100 | 100 | 74 | 74 |
| 1/2 | 92 | 100 | 100 | 100 | 18 | 5 |
| 1/3 | 92 | 100 | 92 | 100 | 15 | 0 |
| 1/4 | 92 | 100 | 92 | 100 | 5 | |
| 1/5 | 92 | 95 | 92 | 93 | 0 | |
| 1/6 | 92 | 95 | 92 | 93 | | |
| 1/7 | 92 | 95 | 92 | 93 | | |
| 1/8 | 92 | 95 | 92 | 93 | | |
| 1/9 | 90 | 92 | 88 | 90 | | |
| 1/10 | 82 | 80 | 80 | 80 | | |

I claim:
1. A liquid crystalline composition which comprises:
(a) at least one biphenyl liquid crystal material represented by the formula (1) and having a positive dielectric anisotropy:

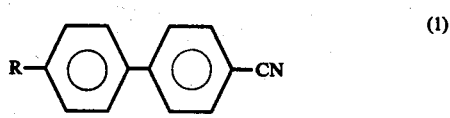

(1)

wherein R represents an alkyl or an alkoxy group; and (b) at least one other liquid crystal material selected from those liquid crystal materials represented by the formulae (2) to (6):

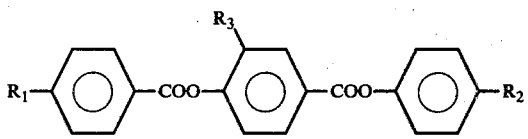
(2)

wherein $R_1$ and $R_2$ each represents an alkyl, alkoxy, acyloxy or alkoxycarbonyloxy group, and wherein $R_3$ represents a hydrogen atom or a methyl group;

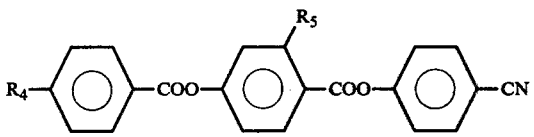
(3)

wherein $R_4$ represents an alkyl or alkoxy group, and wherein $R_5$ represents a hydrogen atom or a methyl group;

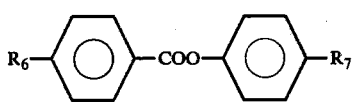
(4)

wherein $R_6$ represents a cyano group and $R_7$ represents an alkyl group having a carbon content of from 3 to 10 or an alkoxy group having a carbon content of from 1 to 9;

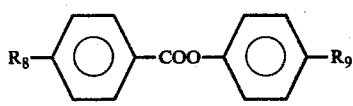
(5)

wherein one of $R_8$ and $R_9$ represents an acyloxy or alkoxycarbonyloxy group and the other of $R_8$ and $R_9$ represents an alkyl group or an alkoxy group, and wherein the sum of the carbon content, not including carbonyl carbons, in both $R_8$ and $R_9$ is not less than 4; and

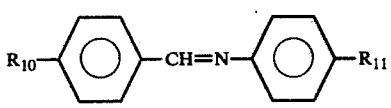
(6)

wherein either one of $R_{10}$ and $R_{11}$ represents a cyano group and the other of $R_{10}$ and $R_{11}$ represents an alkyl, alkoxy or acyloxy group.

2. The liquid crystalline composition as claimed in claim 1, wherein R represents an alkyl group having a carbon content of from 4 to 15.

3. The liquid crystalline composition as claimed in claim 1, wherein R represents an alkoxy group or an alkyl group having a carbon content of from 4 to 10.

4. The liquid crystalline composition as claimed in claim 1, wherein R represents an alkyl group or an alkoxy group having a carbon content of from 5 to 8.

5. The liquid crystalline composition as claimed in claim 1, wherein $R_1$ and $R_2$ each represents an alkyl group having a carbon content of from 1 to 9, an alkoxy group having a carbon content of from 1 to 10, an acyloxy group having a carbon content of from 1 to 7 not including the carbonyl carbon, or an alkoxycarbonyloxy group having a carbon content of from 4 to 6 not including the carbonyl carbon.

6. The liquid crystalline composition as claimed in claim 1, wherein $R_4$ represents an alkyl group having a carbon content of from 3 to 8, or an alkoxy group having a carbon content of from 4 to 6.

7. The liquid crystalline composition as claimed in claim 1, wherein $R_{10}$ represents a cyano group, and $R_{11}$ represents an alkyl group having a carbon content of from 3 to 10, an alkoxy group having a carbon content of from 1 to 8, or an acyloxy group having a carbon content of from 2 to 8 not including the carbonyl carbon.

8. The liquid crystalline composition as claimed in claim 1, wherein $R_{11}$ represents a cyano group, and $R_{10}$ represents an alkyl group having a carbon content of from 3 to 8, an alkoxy group having a carbon content of from 1 to 10, or an acyloxy group having a carbon content of from 2 to 9 not including the carbonyl carbon.

9. The liquid crystalline composition as claimed in claim 1, wherein the liquid crystal material represented by formula (1) is a nematic liquid crystal material.

10. The liquid crystalline composition as claimed in claim 1, containing from 10 to 99% by weight, based on the weight of the composition, of the liquid crystal material of formula (1).

11. The liquid crystalline composition as claimed in claim 1, containing from 20 to 95% by weight, based on the weight of the composition, of the liquid crystal material of formula (1).

12. The liquid crystalline composition as claimed in claim 1, containing from 50 to 90% by weight, based on the weight of the composition, of the liquid crystal material of formula (1).

13. The liquid crystalline composition as claimed in claim 1, wherein said liquid crystal materials of formulae (2) to (6) exhibit the nematic liquid crystal phase.

14. The liquid crystalline composition as claimed in claim 1, containing from 1 to 90% by weight, based on the weight of the composition, of at least one of the liquid crystal materials represented by formulae (2) to (4) and (6).

15. The liquid crystalline composition as claimed in claim 1, containing a material represented by the following formula:

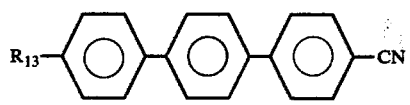

wherein $R_{13}$ represents a straight chain alkyl group having a carbon content of from 5 to 9 or a straight chain alkoxy group having a carbon content of from 6 to 8 in an amount of not more than 30% by weight based on the weight of the composition.

16. The liquid crystalline composition as claimed in claim 1, containing a material represented by the following formula:

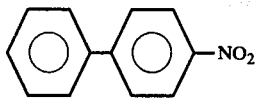

in an amount of not more than 30% by weight based on the weight of the composition.

17. The liquid crystalline composition as claimed in claim 1, containing a material represented by the following formula:

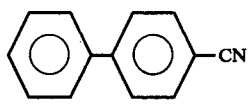

in an amount of not more than 30% by weight based on the weight of the composition.

18. The liquid crystalline composition as claimed in claim 1, containing a material represented by the following formula:

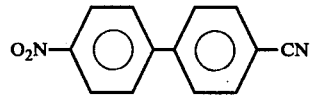

in an amount of not more than 30% by weight based on the weight of the composition.

19. A liquid crystal display device in which the liquid crystalline composition as defined in claim 1 is used.

20. An alpha-numerical display device in which the liquid crystalline composition as defined in claim 1 is used.

21. An image display device in which the liquid crystalline composition as defined in claim 1 is used.

22. A light valve in which the liquid crystalline composition as defined in claim 1 is used.

23. A color display device in which the liquid crystalline composition as defined in claim 1 is used.

24. The liquid crystalline composition as claimed in claim 1 wherein the group represented by each of $R_1$, $R_2$, $R_4$, $R_8$, $R_9$, the one of $R_6$ and $R_7$ which does not represent a cyano group, and the one of $R_{10}$ and $R_{11}$ which does not represent a cyano group, comprises a straight chain group.

25. The liquid crystalline composition as claimed in claim 1, wherein when one of $R_1$ and $R_2$ represents an acyloxy or alkoxycarbonyloxy group, the other of $R_1$ and $R_2$ represents an alkyl or an alkoxy group.

26. The liquid crystalline composition as claimed in claim 1, wherein $R_7$ represents an alkyl group having a carbon content of from 6 to 8 or an alkoxy group having a carbon content of from 6 to 8.

27. A liquid crystalline composition which comprises:
(a) from 10 to 99% by weight of a biphenyl type liquid crystal material represented by the following formula (1) and having a positive dielectric anisotropy; and
(b) from 1 to 90% by weight of another liquid crystal material represented by the following formula (2),

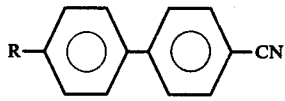

wherein R represents a straight chain alkyl group having a carbon content of from 4 to 15, or a straight chain alkoxy group having a carbon content of from 4 to 10;

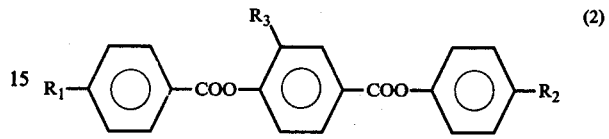

wherein $R_1$ and $R_2$ each represents a straight chain alkyl group having a carbon content of from 1 to 9, a straight chain alkoxy group having a carbon content of from 1 to 10, a straight chain acyloxy group having a carbon content of from 1 to 7 not including the carbonyl carbon, or a straight chain alkoxycarbonyloxy group having a carbon content of from 4 to 6 not including the carbonyl carbon, and wherein $R_3$ represents a hydrogen atom or a methyl group.

28. The liquid crystalline composition as claimed in claim 27, containing a material represented by the following formula:

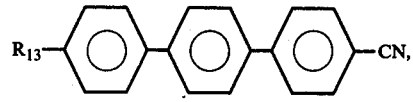

wherein $R_{13}$ represents a straight chain alkyl group having a carbon content of from 5 to 9, or a straight chain alkoxy group having a carbon content of from 6 to 8 in an amount of not more than 30% by weight based on the weight of the composition.

29. The liquid crystalline composition as claimed in claim 27, containing a material represented by the following formula:

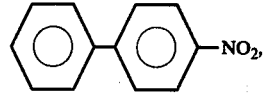

in an amount of not more than 30% by weight based on the weight of the composition.

30. The liquid crystalline composition as claimed in claim 27, containing a material represented by the following formula:

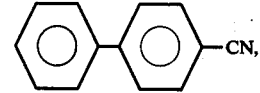

in an amount of not more than 30% by weight based on the weight of the composition.

31. The liquid crystalline composition as claimed in claim 27, containing a material represented by the following formula:

in an amount of not more than 30% by weight based on the weight of the composition.

32. The liquid crystalline composition as claimed in claim 27, wherein $R_1$ and $R_2$ each represents an alkyl group, an alkoxy group or an acyloxy group.

33. The liquid crystalline composition as claimed in claim 32, wherein $R_1$ represents an alkyl group having from 2 to 9 carbon atoms, an alkoxy group having from 1 to 8 carbon atoms, or an acyloxy group having from 1 to 7 carbon atoms not including the carbonyl carbon, and wherein $R_2$ represents an alkyl group having from 1 to 8 carbon atoms or an alkoxy group having from 1 to 8 carbon atoms.

34. A liquid crystalline composition which comprises:
(a) from 10 to 99% by weight of a biphenyl type liquid crystal material represented by the following formula (1) and having a positive dielectric anisotropy; and
(b) from 1 to 90% by weight of a mixture of liquid crystal materials represented by the following formulae (2) and (5), wherein said liquid crystal material of formula (5) is present in said mixture in an amount of from 10 to 50% by weight based on the weight of said mixture,

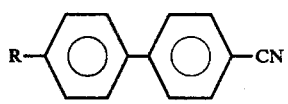

wherein R represents an alkyl group having a carbon content of from 4 to 15, or an alkoxy group having a carbon content of from 4 to 10;

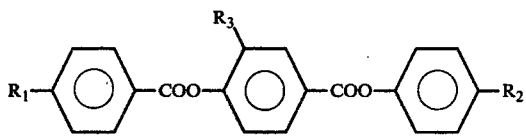

wherein $R_1$ and $R_2$ each represents an alkyl group having a carbon content of from 1 to 9, an alkoxy group having a carbon content of from 1 to 10, an acyloxy group having a carbon content of from 1 to 7 not including the carbonyl carbon or an alkoxycarbonyloxy group having a carbon content of from 4 to 6 not including the carbonyl carbon; and wherein $R_3$ represents a hydrogen atom or a methyl group;

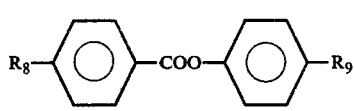

wherein $R_8$ and $R_9$ represents an alkyl group having a carbon content of from 2 to 10, an alkoxy group having a carbon content of from 1 to 8, an acyloxy group having a carbon content of from 1 to 7 not including the carbonyl carbon, or an alkoxycarbonyloxy group having a carbon content of from 3 to 8 not including the carbonyl carbon.

35. A liquid crystalline composition which comprises:
(a) at least one biphenyl liquid crystal material having a positive dielectric anisotropy and represented by the formula (1):

wherein R represents a straight chain alkyl group having from 4 to 15 carbon atoms or a straight chain alkoxy group having from 4 to 10 carbon atoms; and
(b) at least one other liquid crystal material represented by the formula (2):

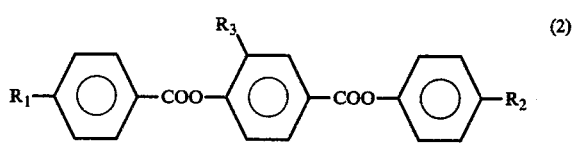

wherein $R_1$ and $R_2$ each represents a straight chain alkyl group having 1 to 9 carbon atoms, a straight chain alkoxy group having 1 to 10 carbon atoms, a straight chain acyloxy group having 1 to 7 carbon atoms not including the carbonyl carbon, or a straight chain alkoxycarbonyloxy group having 4 to 6 carbon atoms not including the carbonyl carbon, and wherein $R_3$ represents a hydrogen atom or a methyl group; and
(c) at least one other liquid crystal material represented by the formula (4):

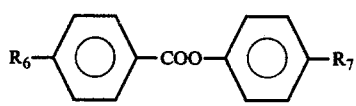

wherein either one of $R_6$ and $R_7$ represents a cyano group and the other of $R_6$ and $R_7$ represents an alkyl, alkoxy, acyloxy or alkoxycarbonyloxy group.

36. The liquid crystalline composition as claimed in claim 35, wherein $R_6$ represents a cyano group, and wherein $R_7$ represents an alkyl group having from 3 to 10 carbon atoms or an alkoxy group having from 1 to 9 carbon atoms.

37. The liquid crystalline composition as claimed in claim 35, wherein $R_6$ represents a cyano group, and $R_7$ represents an alkyl group having from 6 to 8 carbon atoms or an alkoxy group having from 6 to 8 carbon atoms.

38. The liquid crystalline composition as claimed in claim 35, wherein $R_7$ represents a cyano group, and $R_6$ represents an alkyl group having from 3 to 10 carbon atoms, an alkoxy group having from 1 to 9 carbon atoms, an acyloxy group having from 5 to 8 carbon atoms not including the carbonyl carbon, or an alkoxycarbonyloxy group having from 5 to 8 carbon atoms not including the carbonyl carbon.

39. A liquid crystalline composition which comprises:

(a) at least one biphenyl liquid crystal material having a positive dielectric anisotropy and represented by the formula (1):

(1)

wherein R represents a straight chain alkyl group having from 4 to 15 carbon atoms or a straight chain alkoxy group having from 4 to 10 carbon atoms group; and (b) at least one other liquid crystal material represented by the formula (2):

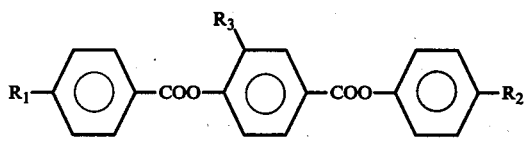
(2)

wherein $R_1$ and $R_2$ each represents a straight chain alkyl group having 1 to 9 carbon atoms, a straight chain alkoxy group having 1 to 10 carbon atoms, a straight chain acyloxy group having 1 to 7 carbon atoms not including the carbonyl carbon, or a straight chain alkoxycarbonyloxy group having 4 to 6 carbon atoms not including the carbonyl carbon, and wherein $R_3$ represents a hydrogen atom or a methyl group; and (c) at least one other liquid crystal material represented by the formula (6):

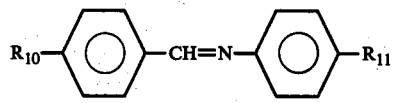
(6)

wherein either one of $R_{10}$ and $R_{11}$ represents a cyano group and the other of $R_{10}$ and $R_{11}$ represents an alkyl, alkoxy or acyloxy group.

40. The liquid crystalline composition as claimed in claim 39, wherein $R_{11}$ represents a cyano group, and wherein $R_{10}$ represents an alkyl group having from 3 to 8 carbon atoms, an alkoxy group having from 1 to 10 carbon atoms, or an acyloxy group having from 2 to 9 carbon atoms not including the carbonyl carbon.

41. The liquid crystalline composition as claimed in claim 39, wherein $R_{10}$ represents a cyano group, and wherein $R_{11}$ represents an alkyl group having from 3 to 10 carbon atoms, an alkoxy group having from 1 to 8 carbon atoms or an acyloxy group having from 2 to 8 carbon atoms not including the carbonyl carbon.

42. The liquid crystalline composition as claimed in claim 38, wherein $R_7$ represents a cyano group, and $R_6$ represents an alkyl group having from 7 to 9 carbon atoms or an alkoxy group having from 5 to 7 carbon atoms.

43. The liquid crystalline composition as claimed in claim 40, wherein $R_{11}$ represents a cyano group, and wherein $R_{10}$ represents an alkyl group having from 4 to 7 carbon atoms, an alkoxy group having from 1 to 8 carbon atoms, or an acyloxy group having from 4 to 7 carbon atoms not including the carbonyl carbon.

44. The liquid crystalline composition as claimed in claim 41, wherein $R_{10}$ represents a cyano group, and wherein $R_{11}$ represents an alkyl group having from 3 to 8 carbon atoms.

45. A liquid crystalline composition which comprises:
(a) at least one biphenyl liquid crystal material having a positive dielectric anisotropy and represented by the formula (1):

(1)

wherein R represents an alkyl group; and (b) at least one other liquid crystal material represented by the formula (6):

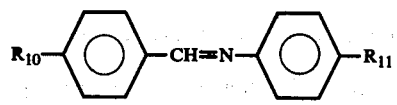
(6)

wherein either one of $R_{10}$ and $R_{11}$ represents a cyano group and the other of $R_{10}$ and $R_{11}$ represents an alkyl, alkoxy or acyloxy group.

46. The liquid crystalline composition as claimed in claim 45, wherein R represents an alkyl group having from 4 to 15 carbon atoms.

47. The liquid crystalline composition as claimed in claim 46, wherein $R_{10}$ represents a cyano group, and wherein $R_{11}$ represents an alkyl group having from 3 to 10 carbon atoms, an alkoxy group having from 1 to 4 carbon atoms, or an acyloxy group having from 2 to 8 carbon atoms not including the carbonyl carbon.

48. The liquid crystalline composition as claimed in claim 46, wherein $R_{11}$ represents a cyano group, and $R_{10}$ represents an alkyl group having from 3 to 8 carbon atoms, an alkoxy group having from 1 to 10 carbon atoms, or an acyloxy group having from 3 to 9 carbon atoms not including the carbonyl carbon.

49. A liquid crystalline composition which comprises:
(a) at least one biphenyl liquid crystal material having a positive dielectric anisotropy and represented by the formula (1):

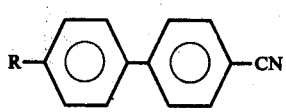
(1)

wherein R represents an alkyl group;

(b) at least one other liquid crystal material selected from those liquid crystal materials represented by the formulae (2) and (4):

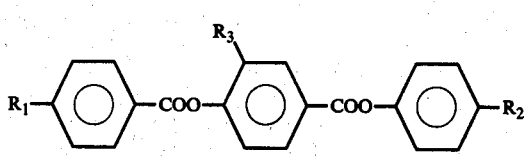
(2)

wherein $R_1$ and $R_2$ each represents an alkyl or alkoxy group, and $R_3$ represents a hydrogen atom or a methyl group;

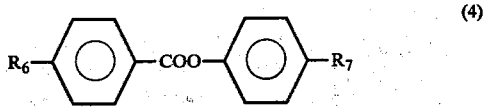

wherein $R_6$ represents a cyano group and $R_7$ represents an alkyl group having from 3 to 9 carbon atoms or an alkoxy group having from 1 to 7 carbon atoms; and (c) at least one other liquid crystal material represented by the formula (5):

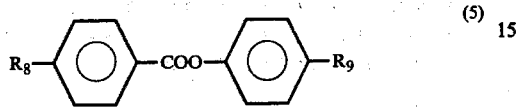

wherein $R_8$ and $R_9$ each represents an alkyl or alkoxy group.

50. The liquid crystalline composition as claimed in claim 49, wherein R represents an alkyl group having from 4 to 15 carbon atoms, and wherein said $R_1$ and $R_2$ each represents an alkyl group having from 1 to 10 carbon atoms or an alkoxy group having from 1 to 10 carbon atoms.

51. The liquid crystalline composition as claimed in claim 50, wherein $R_1$ represents an alkyl group having from 1 to 8 carbon atoms or an alkoxy group having from 1 to 6 carbon atoms, and wherein $R_2$ represents an alkyl group having from 2 to 7 carbon atoms or an alkoxy group having from 2 to 10 carbon atoms.

52. A liquid crystalline composition which comprises:
(a) at least one biphenyl liquid crystal material having a positive dielectric anisotropy and represented by the formula (1):

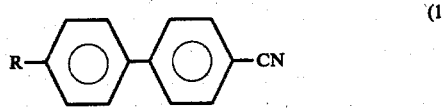

wherein R represents an alkyl or an alkoxy group; and
(b) at least one other liquid crystal material represented by the formula (3):

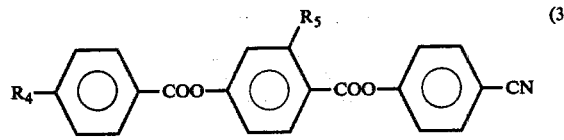

wherein $R_4$ represents an alkyl or alkoxy group, and wherein $R_5$ represents a hydrogen atom or a methyl group.

53. The liquid crystalline composition as claimed in claim 52, wherein R represents an alkyl group having from 4 to 15 carbon atoms or an alkoxy group having from 4 to 10 carbon atoms, and wherein $R_4$ represents an alkyl group having from 3 to 8 carbon atoms or an alkoxy group having from 4 to 6 carbon atoms.

54. The liquid crystalline composition as claimed in claim 53, wherein the groups represented by R and $R_4$ are straight chain groups.

55. The liquid crystalline composition as claimed in claim 52, containing from 10 to 95 weight percent, based on the weight of the composition, of said material represented by formula (1), and from 90 to 5 weight percent, based on the weight of the composition, of the material of formula (3).

56. The liquid crystalline composition as claimed in claim 52, containing from 20 to 90 weight percent, based on the weight of the composition, of said material represented by formula (1), and from 80 to 10 weight percent, based on the weight of the composition, of the material of formula (3).

57. A liquid crystalline composition which comprises:
(a) at least one biphenyl liquid crystal material having a positive dielectric anisotropy and represented by the formula (1):

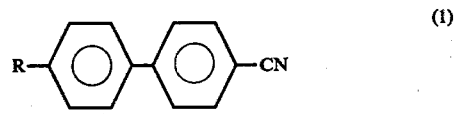

wherein R represents an alkyl group having from 4 to 15 carbon atoms or an alkoxy group having from 4 to 10 carbon atoms; and
(b) at least one other liquid crystal material represented by the formula (4):

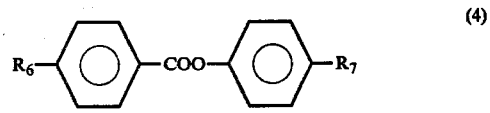

wherein $R_6$ represents a cyano group and $R_7$ represents an alkyl group having from 3 to 7 carbon atoms or an alkoxy group having from 1 to 9 carbon atoms.

58. The liquid crystalline composition as claimed in claim 57, wherein the groups represented by R and $R_7$ are straight chain groups.

59. The liquid crystalline composition as claimed in claim 57, wherein the groups represented by R are straight chain groups.

60. The liquid crystalline composition as claimed in claim 57, containing from 10 to 95 weight percent, based on the weight of the composition, of said material represented by formula (1), and from 90 to 5 weight percent, based on the weight of the composition, of the material of formula (4).

61. The liquid crystalline composition as claimed in claim 57, containing from 30 to 90 weight percent, based on the weight of the composition, of said material represented by formula (1), and from 70 to 10 weight percent, based on the weight of the composition, of the material of formula (4).

62. A liquid crystalline composition which comprises:
(a) at least one biphenyl liquid crystal material having a positive dielectric anisotropy and represented by the formula (1):

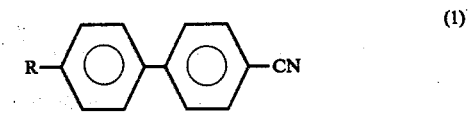

wherein R represents an alkyl or alkoxy group; and
(b) at least one other liquid crystal material represented by the formula (2):

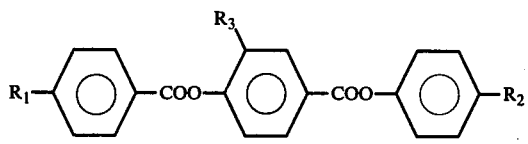

(2)

wherein $R_1$ and $R_2$ each represents an alkyl group, an alkoxy group, an acyloxy group, or an alkoxycarbonyloxy group, and wherein $R_3$ represents a hydrogen atom or a methyl group; and (c) at least one other liquid crystal material represented by the formula (3):

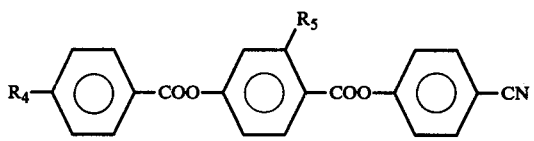

(3)

wherein $R_4$ represents an alkyl or alkoxy group, and wherein $R_5$ represents a hydrogen atom or a methyl group.

63. The liquid crystalline composition as claimed in claim 62, wherein R represents an alkyl group having from 4 to 15 carbon atoms or an alkoxy group having from 4 to 10 carbon atoms, wherein $R_1$ and $R_2$ each represents an alkyl group having from 1 to 9 carbon atoms, an alkoxy group having from 1 to 10 carbon atoms, an acyloxy group having from 1 to 7 carbon atoms not including the carbonyl carbon or an alkoxycarbonyloxy group having from 4 to 6 carbon atoms not including the carbonyl carbon, and wherein $R_4$ represents an alkyl group having from 3 to 8 carbon atoms or an alkoxy group having from 4 to 6 carbon atoms.

64. The liquid crystalline composition as claimed in claim 63, wherein the groups represented by R, $R_1$, $R_2$, and $R_4$ are all straight chain groups.

65. A liquid crystalline composition which comprises:
(a) at least one biphenyl liquid crystal material represented by the formula (1) and having a positive dielectric anisotropy:

(1)

wherein R represents an alkyl or an alkoxy group; and (b) at least one other liquid crystal material represented by the formula (2):

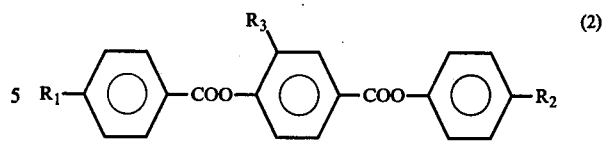

(2)

wherein $R_1$ and $R_2$ each represents an alkyl, alkoxy, acyloxy or alkoxycarbonyloxy group, and wherein $R_3$ represents a hydrogen atom or a methyl group;

(c) at least one other liquid crystal material represented by the formula (3):

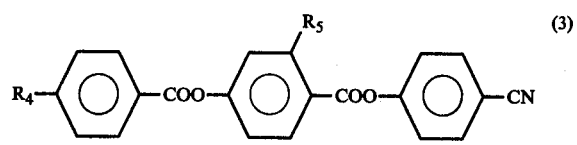

(3)

wherein $R_4$ represents an alkyl or alkoxy group, and wherein $R_5$ represents a hydrogen atom or a methyl group; and (d) at least one other liquid crystal material represented by the formula (5):

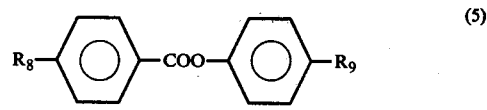

(5)

wherein $R_8$ and $R_9$ each represents an alkyl, alkoxy, acyloxy or alkoxycarbonyloxy group.

66. The liquid crystalline composition as claimed in claim 65, wherein R represents an alkyl group having from 4 to 15 carbon atoms or an alkoxy group having from 4 to 10 carbon atoms, wherein $R_1$ and $R_2$ each represents an alkyl group having from 1 to 9 carbon atoms, an alkoxy group having from 1 to 10 carbon atoms, an acyloxy group having from 1 to 7 carbon atoms not including the carbonyl carbon or an alkoxycarbonyloxy group having from 4 to 6 carbon atoms not including the carbonyl carbon, wherein $R_4$ represents an alkyl group having from 3 to 8 carbon atoms or an alkoxy group having from 4 to 6 carbon atoms, and wherein $R_8$ and $R_9$ each represents an alkyl group having from 2 to 9 carbon atoms, an alkoxy group having from 1 to 8 carbon atoms, an acyloxy group having from 1 to 7 carbon atoms not including the carbonyl carbon, or an alkoxycarbonyloxy group having from 3 to 8 carbon atoms not including the carbonyl carbon.

67. The liquid crystalline composition as claimed in claim 66, wherein the groups represented by R, $R_1$, $R_2$, $R_4$, $R_8$ and $R_9$ are all straight chain groups.

* * * * *

UNITED STATES PATENT OFFICE
CERTIFICATE OF CORRECTION

Patent No. 4,137,192   Dated January 30, 1979

Inventor(s)   YOJI MATSUFUJI

It is certified that error appears in the above-identified patent and that said Letters Patent are hereby corrected as shown below:

Column 15, Table 2, for material C8, change the $R_2$ group from "$C_4H\ _9$" to --$C_4H_9$--

Column 15, Table 2, for material D8, change the $R_1$ group from "$C_7H_{13}$" to --$C_6H_{13}$--

Column 15, Table 2, for material D9, change the $R_1$ group from "$C_8H_9$" to --$C_4H_9$--

Column 15, Table 2, for material F5, change the $R_2$ group from "$CH_3O$" to --$CH_3O$--

Column 15, Table 2, for material F6, change the $R_1$ group from "$C_5H_{13}O$" to --$C_6H_{13}O$--

Column 16, Table 5, for material L30, change the $R_8$ group "$C_2H_5$" to --$C_2H_5O$--

Column 17, line 38, in Table 7, change "Type Material" to --Type Materials--

Column 19, line 46, change "an value M.R." to --an M.R. value--

UNITED STATES PATENT OFFICE
CERTIFICATE OF CORRECTION

Patent No. 4,137,192  Dated January 30, 1979

Inventor(s) YOJI MATSUFUJI

It is certified that error appears in the above-identified patent and that said Letters Patent are hereby corrected as shown below:

Column 20, line 12, change "$A_2, A_4 C_4$" to --$A_2, A_4, G_4$--

Column 22, line 14, in Table 13 change "$F_4(2.2)$" to --$E_4(2.2)$--

Column 22, line 15, in Table 13 change "$E_2(3)$" to --$F_2(3)$--

Column 23, line 7, in Table 15, change "Benzylidine" to --Benzylidene--

Column 24, line 59, in Table 18, change "$U_3$" (first ccurrence) to --$U_2$--

Signed and Sealed this

Third Day of July 1979

[SEAL]

Attest:

Attesting Officer

LUTRELLE F. PARKER
*Acting Commissioner of Patents and Trademarks*